(12) United States Patent
Moriyama

(10) Patent No.: US 9,409,418 B2
(45) Date of Patent: Aug. 9, 2016

(54) PRINT TAPE AND TAPE PRINTER

(71) Applicant: Brother Kogyo Kabushiki Kaisha, Nagoya-shi, Aichi-ken (JP)

(72) Inventor: Satoru Moriyama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/446,706

(22) Filed: Jul. 30, 2014

(65) Prior Publication Data
US 2015/0034715 A1 Feb. 5, 2015

(30) Foreign Application Priority Data

Jul. 31, 2013 (JP) .................................. 2013-159794
Jul. 31, 2013 (JP) .................................. 2013-159796

(51) Int. Cl.
  *B41J 11/00* (2006.01)
  *G06K 19/06* (2006.01)
  *B41J 3/407* (2006.01)
  *B41J 11/46* (2006.01)

(52) U.S. Cl.
  CPC .............. *B41J 11/008* (2013.01); *B41J 3/4075* (2013.01); *B41J 11/46* (2013.01); *G06K 19/06028* (2013.01)

(58) Field of Classification Search
  CPC ........ B41J 11/008; B41J 11/46; B41J 3/4075; G06K 19/06028
  USPC ......................................... 235/375, 487, 494
  See application file for complete search history.

(56) References Cited

U.S. PATENT DOCUMENTS

| | | | | |
|---|---|---|---|---|
| 5,803,635 | A * | 9/1998 | Austin et al. ................... | 400/708 |
| 5,829,897 | A * | 11/1998 | Murai ........................ | 400/615.2 |
| 6,058,637 | A * | 5/2000 | Duncan ........................... | 40/633 |
| 7,726,893 | B2 * | 6/2010 | Harada et al. .............. | 400/615.2 |
| 7,747,544 | B2 * | 6/2010 | Cordery et al. ............... | 705/408 |
| 7,992,791 | B2 * | 8/2011 | Fukui et al. ................... | 235/492 |
| 8,113,727 | B2 * | 2/2012 | Niwa et al. ..................... | 400/76 |
| 8,387,293 | B2 * | 3/2013 | Wanibuchi ..................... | 40/633 |
| 8,436,734 | B2 * | 5/2013 | Kato et al. ................. | 340/572.8 |
| 8,561,331 | B2 * | 10/2013 | Wanibuchi ..................... | 40/633 |
| 2005/0002715 | A1 * | 1/2005 | Fries et al. ...................... | 400/88 |

(Continued)

FOREIGN PATENT DOCUMENTS

| | | |
|---|---|---|
| JP | H09-240121 A | 9/1997 |
| JP | 2005-022130 A | 1/2005 |

(Continued)

OTHER PUBLICATIONS

Jan. 5, 2015—(EP) Extended Search Report—App 14179063.4.

*Primary Examiner* — Paultep Savusdiphol
(74) *Attorney, Agent, or Firm* — Banner & Witcoff, Ltd.

(57) ABSTRACT

A reverse surface of a print tape includes a reference portion and a reference portion. The reference portion is configured to identify a position of a print area. The non-reference portion includes a plurality of through holes. The reference portion includes a barcode that includes a first mark and a second mark. The non-reference portion includes at least one first area and a second area. The at least one first area and the second area are provided to obtain a color arrangement in which the non-reference portion does not include the barcode in the lengthwise direction, where it is assumed that each of the plurality of through holes is a portion indicating both a first color and a second color.

19 Claims, 22 Drawing Sheets

(56) References Cited

U.S. PATENT DOCUMENTS

| | | | |
|---|---|---|---|
| 2005/0262747 A1* | 12/2005 | Ali et al. | 40/633 |
| 2006/0187492 A1* | 8/2006 | Koie et al. | 358/3.31 |
| 2007/0130091 A1* | 6/2007 | Cordery et al. | 705/408 |
| 2008/0003043 A1* | 1/2008 | Fukui et al. | 400/615.2 |
| 2008/0231423 A1* | 9/2008 | Maeda et al. | 340/10.1 |
| 2008/0232886 A1* | 9/2008 | Kato et al. | 400/76 |
| 2008/0266100 A1* | 10/2008 | Moriyama et al. | 340/572.1 |
| 2008/0266579 A1* | 10/2008 | Suzuki et al. | 358/1.1 |
| 2008/0266602 A1* | 10/2008 | Moriyama et al. | 358/1.15 |
| 2008/0267685 A1* | 10/2008 | Moriyama et al. | 400/613 |
| 2008/0279605 A1* | 11/2008 | Yamaguchi et al. | 400/613 |
| 2009/0002746 A1* | 1/2009 | Niwa et al. | 358/1.15 |
| 2009/0277061 A1* | 11/2009 | Jain et al. | 40/633 |
| 2009/0319072 A1* | 12/2009 | Fukui et al. | 700/110 |
| 2011/0001769 A1* | 1/2011 | Nagai | 347/5 |
| 2011/0239507 A1* | 10/2011 | Wanibuchi | 40/633 |
| 2013/0129959 A1* | 5/2013 | Wanibuchi | 428/43 |

FOREIGN PATENT DOCUMENTS

| | | |
|---|---|---|
| JP | 2005-195633 A | 7/2005 |
| JP | 2009-234118 A | 10/2009 |
| JP | 2011-181040 A | 9/2011 |
| WO | 2011/064908 A1 | 6/2011 |

* cited by examiner

PRINT TAPE AND TAPE PRINTER

CROSS-REFERENCE TO RELATED APPLICATION

This application claims priority to Japanese Patent Applications No. 2013-159794, filed Jul. 31, 2013, and No. 2013-159796, filed Jul. 31, 2013. The disclosure of the foregoing applications is incorporated herein by reference in its entirety.

BACKGROUND

The present disclosure relates to a print tape that is a medium on which one or more characters can be printed by a tape printer, and to a tape printer that is configured to print one or more characters on a print tape.

A tape printer prints one or more characters on a print tape in accordance with an application, and creates labels, statements and wrist bands etc., for example. For example, a printing mark is formed on or a detection hole is formed in the print tape, as a reference portion that is used to identify a position of a print area. The tape printer starts printing after positioning the print tape based on the reference portion that is optically detected. Depending on the application, holes may be formed in the print tape. A technology is known that is used to optically distinguish between the reference portion and the holes formed in the print tape.

In a first example, a statement paper is known that is used for printing a statement in which binding holes have been formed. In an automatic transaction device, a light emitting sensor is provided facing a reflective sensor in order to detect a printing mark of the statement paper. By using a measurement value when the light emitting sensor is illuminated, the automatic transaction device can detect the printing mark without being influenced by the binding holes formed in the statement paper.

In a second example, a medium is known that is used for printing wrist bands in which are formed adjustment holes and a fixing hole that are used to fix a fastener. A detection hole that has a different aperture width than the adjustment holes and the fixing hole of the wrist band is formed in the medium. A printer can distinguish the detection hole from the adjustment holes and the fixing hole and detect the detection hole due to a difference in pulse width of a detection signal of a reflective sensor.

SUMMARY

In the first example, it is necessary to provide the reflective sensor separately from the light emitting sensor in the automatic transaction device, and there is a possibility that the structure of the automatic transaction device becomes complex. In the second example, the printer compares the output level of the detection signal with a threshold value and thus distinguishes between the tape surface of the medium and the holes (namely, the adjustment holes, the fixing hole and the detection hole). When the magnitude of the threshold value is not appropriate, the printer cannot distinguish between the tape surface and the holes and there is a possibility that the detection hole cannot be accurately detected.

Various embodiments of the broad principles derived herein provide a print tape and a tape printer that allow the tape printer to accurately detect a reference portion that is used to identify a position of a print area, while suppressing an increase in complexity of a structure of the tape printer.

The embodiments herein provide a print tape that includes a print surface, a reverse surface, a print area, a reference portion, and a non-reference portion. The print surface and the reverse surface are both surfaces of the print tape. The print area is an area provided on the print surface and in which one or more characters are printable. The reference portion is an area provided on the reverse surface and is configured to identify a position of the print area. The non-reference portion is an area provided on the reverse surface and is provided on one of a first direction side and a second direction side of the reference portion. The first direction and the second direction are included in a lengthwise direction of the print tape and are mutually opposite directions. The non-reference portion includes a plurality of through holes that penetrate the print tape and that are aligned along the lengthwise direction with an interval therebetween. The reference portion includes a barcode that is an indicator indicating the reference portion. The barcode is at least longer than each of the plurality of through holes in a width direction of the print tape. The barcode includes a first mark and a second mark that are arranged side by side, without a gap therebetween, in the lengthwise direction in a predetermined order. The first mark is a portion of a first color that is one of black and white. The second mark is a portion of a second color that is one of black and white and is different than the first color. The non-reference portion includes at least one first area and a second area. The at least one first area is an area of the first color provided on at least one of the first direction side and the second direction side with respect to each of at least one of the plurality of through holes. The second area is an area of the second color provided on a portion that is different than the at least one first area of the non-reference portion. The at least one first area and the second area are provided to obtain a color arrangement in which the non-reference portion does not include the barcode in the lengthwise direction, where it is assumed that each of the plurality of through holes is a portion indicating both the first color and the second color.

The embodiments herein also provide a print tape that is configured to be used by a tape printer. The print tape includes a print surface, a reverse surface, a print area, a reference portion, and a non-reference portion. The print surface and the reverse surface are both surfaces of the print tape. The print area is an area provided on the print surface and in which one or more characters are printable. The reference portion is an area provided on the reverse surface and is configured to identify a position of the print area. The tape printer is configured to irradiate detection light onto the print tape that is being fed in a lengthwise direction of the print tape and to detect the reference portion based on an amount of reflected light. The non-reference portion is an area provided on the reverse surface and is provided on one of a first direction side and a second direction side of the reference portion. The first direction and the second direction are included in the lengthwise direction of the print tape and are mutually opposite directions. The non-reference portion includes a plurality of unstable portions that are aligned along the lengthwise direction with an interval therebetween. The reference portion includes a barcode that is an indicator indicating the reference portion. The barcode is at least longer than each of the plurality of unstable portions in a width direction of the print tape. The barcode includes a first mark and a second mark that are arranged side by side, without a gap therebetween, in the lengthwise direction in a predetermined order. The first mark is a portion of a first color that is configured to make the amount of reflected light to be less than a predetermined threshold value. The second mark is a portion of a second color that is configured to make the amount of reflected light to be equal to or more than the threshold value. The plurality of unstable portions are portions for which the amount of reflected light is less than the threshold value or is equal to or more than the threshold value, depending on a magnitude of the threshold value. The non-reference portion includes at least one first area and a second area. The at least one first area is an area of the first color provided on at least one of the first direction side and the second direction side with respect to each of at least one of the plurality of unstable portions. The second area is an area of the second color provided on a portion that is different than the at least one first area of the non-reference portion. The at least one first area and the second area are provided to obtain a color arrangement in which the non-reference portion does not include the barcode in the lengthwise direction, where it is assumed that each of the plurality of unstable portions is a portion indicating both the first color and the second color.

The embodiments herein also provide a tape printer that includes a feeding portion, a print head, a reflective sensor, a processor, and a memory. The feeding portion is configured to feed a print tape in the lengthwise direction. The print tape includes a print surface and a reverse surface that are both surfaces of the print tape. The print surface includes the print area that is an area in which one or more characters are printable. The reverse surface includes a reference portion and a non-reference portion. The reference portion is an area that is configured to identify a position of the print area. The non-reference portion is an area that is provided on one of a first direction side and a second direction side of the reference portion. The first direction and the second direction are included in a lengthwise direction of the print tape and are mutually opposite directions. The non-reference portion includes a plurality of unstable portions that are aligned along the lengthwise direction with an interval therebetween. The reference portion includes a barcode that is an indicator indicating the reference portion. The barcode is at least longer than each of the plurality of unstable portions in a width direction of the print tape. The print head is configured to print one or more characters onto the print tape that is fed by the feeding portion. The reflective sensor is configured to irradiate a detection light onto at least a position in the width direction at which the reference portion is provided, on the print tape fed by the feeding portion, and configured to measure an amount of reflected light. The barcode includes a first mark and a second mark that are arranged side by side, without a gap therebetween, in the lengthwise direction in a predetermined order. The first mark is a portion of a first color that is configured to make the amount of reflected light to be less than a predetermined threshold value. The second mark is a portion of a second color that is configured to make the amount of reflected light to be equal to or more than the threshold value. The plurality of unstable portions are portions for which the amount of reflected light is less than the threshold value or is equal to or more than the threshold value, depending on a magnitude of the threshold value. The non-reference portion includes at least one first area and a second area. The at least one first area is an area of the first color provided on at least one of the first direction side and the second direction side with respect to each of at least one of the plurality of unstable portions. The second area is an area of the second color provided on a portion that is different to than the at least one first area of the non-reference portion. The at least one first area and the second area are provided to obtain a color arrangement in which the non-reference portion does not include the barcode in the lengthwise direction, where it is assumed that each of the plurality of unstable portions is a portion indicating both the first color and the second color. The memory stores computer-readable instructions, the computer-readable instructions, when executed by the processor, causing the tape printer to perform operations comprising: detecting, based on the amount of reflected light measured by the reflective sensor, a first continuous portion over which the second color continues for at least a predetermined length; detecting, based on the amount of reflected light measured by the reflective sensor, a second continuous portion over which the first color continues within a predetermined range, and which is adjacent to the first continuous portion in the feed direction of the print tape, and causing the print head to print one or more characters on the print area of the print tape that is fed by the feeding portion, based on the reference portion that includes the first continuous portion detected by the first detection portion and the second continuous portion detected by the second detection portion.

BRIEF DESCRIPTION OF THE DRAWINGS

Embodiments of the present disclosure will be described below in detail with reference to the accompanying drawings in which.

DETAILED DESCRIPTION

Hereinafter, embodiments that embody the present disclosure will be explained with reference to the drawings. The drawings that are referred to are used to explain technological features that can be adopted by the present disclosure, and structures of devices etc. described herein are simply explanatory examples and are not intended to limit the present disclosure to these examples.

1. Tape Printer 1

A tape printer 1 will be explained with reference to FIG. 1 to FIG. 3. In the following explanation, the lower left side, the upper right side, the upper left side, the lower right side, the upper side and the lower side in FIG. 1 and FIG. 2 respectively define the front side, the rear side, the left side, the right side, the upper side and the lower side of the tape printer 1.

Figure 1:
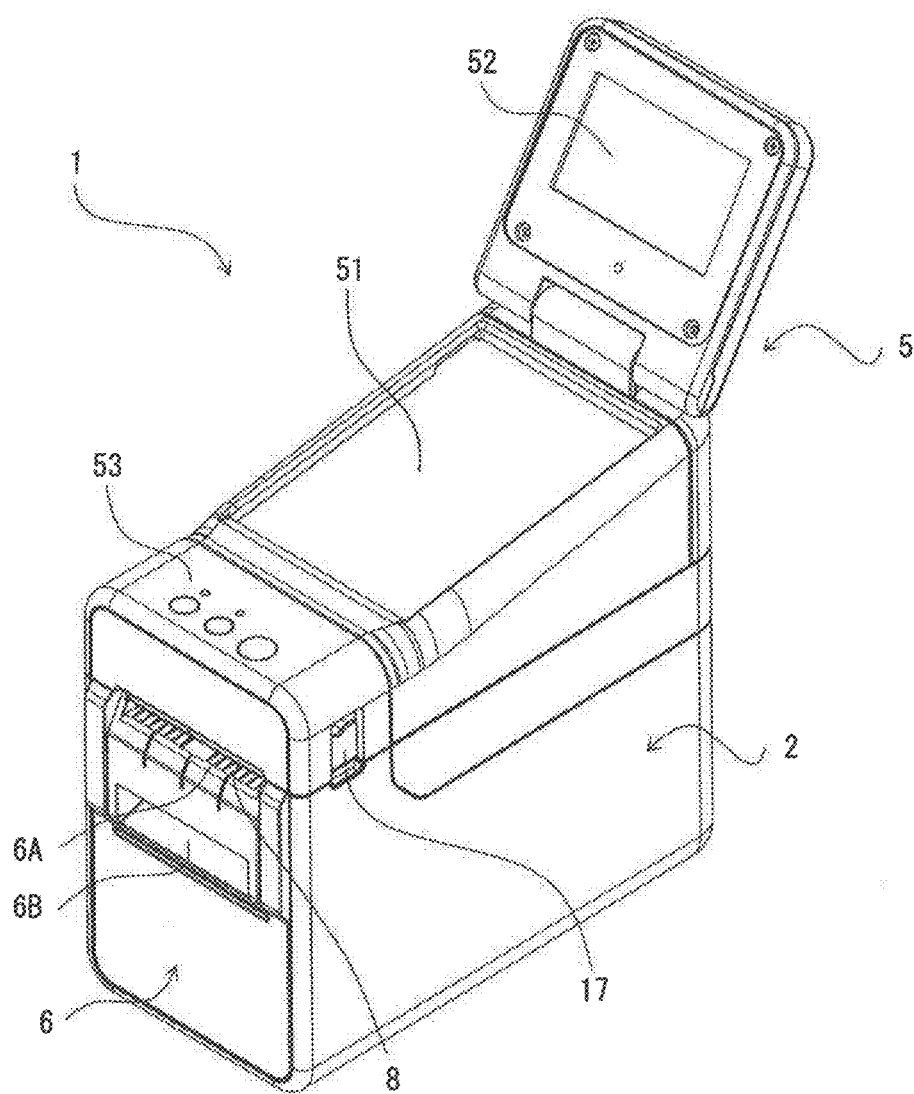
FIG. 1 is a perspective view of a tape printer when a top cover unit is closed.

As shown in FIG. 1, the tape printer 1 includes a housing 2, which is provided with a front panel 6, and a top cover unit 5. The top cover unit 5 is configured to be opened and closed, with respect to the housing 2, by rotating around a rotating shaft portion 2A (refer to FIG. 3) that is provided on a rear end portion of the housing 2. Release catches 17 are provided on both the left and right sides of the housing 2. When the release catches 17 are pushed upward, the latching of the top cover unit 5 to the housing 2 is released and the top cover unit 5 can be opened.

The top cover unit 5 is provided with a touch panel 51, a substantially rectangular liquid crystal panel 52 and an operation button portion 53. A user can input various information (text to be printed, for example) on the touch panel 51 by a touch operation. Various information can be displayed on the liquid crystal panel 52. The operation button portion 53 includes a power source button, a status button and a feed button etc. A first discharge opening 6A and a second discharge opening 6B are provided on the touch panel 6. The second discharge opening 6B is provided below the first discharge opening 6A. A cutting blade 8 is provided in the first discharge opening 6A.

Figure 2:
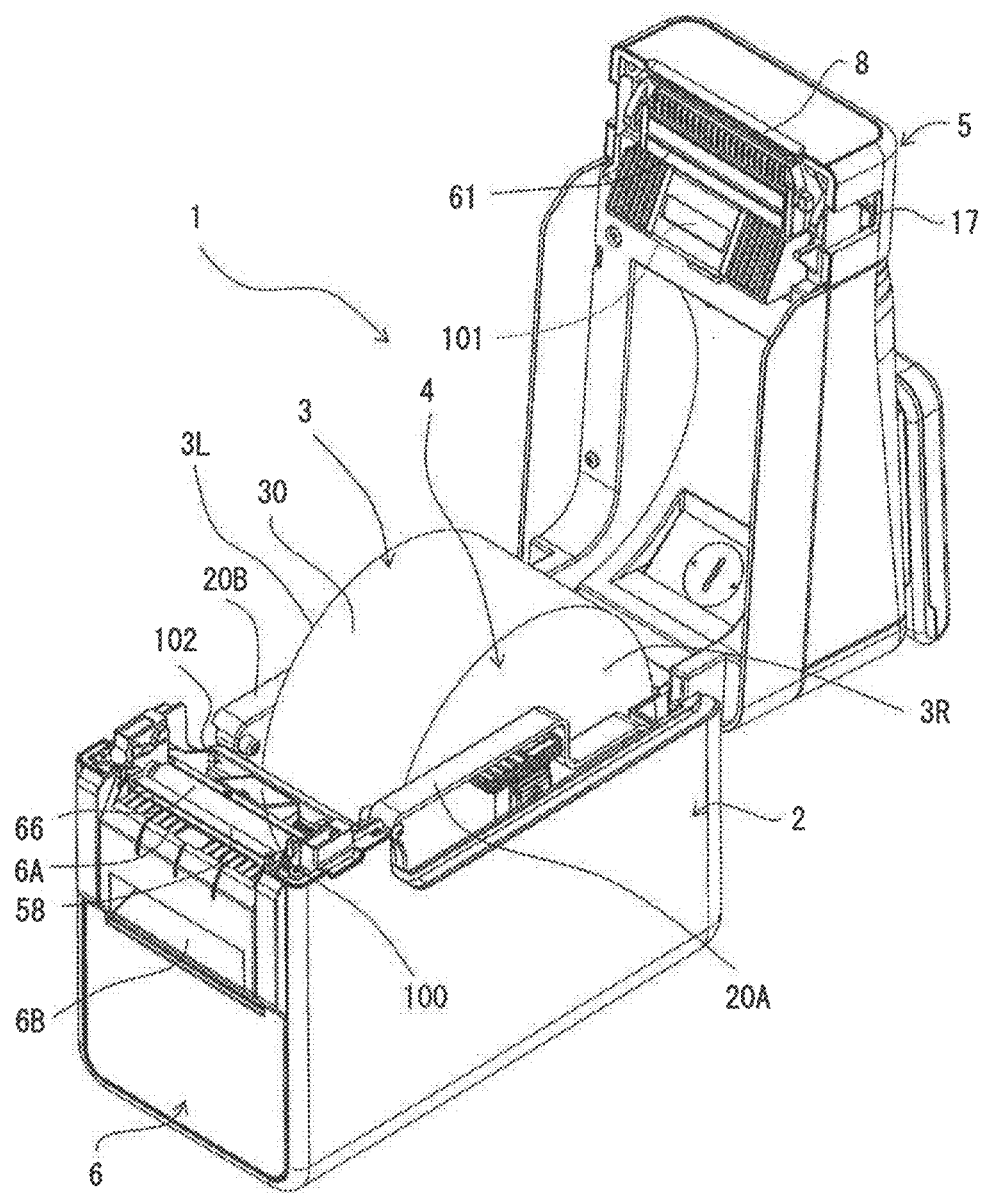
FIG. 2 is a perspective view of the tape printer when the top cover unit is open.
Figure 3:
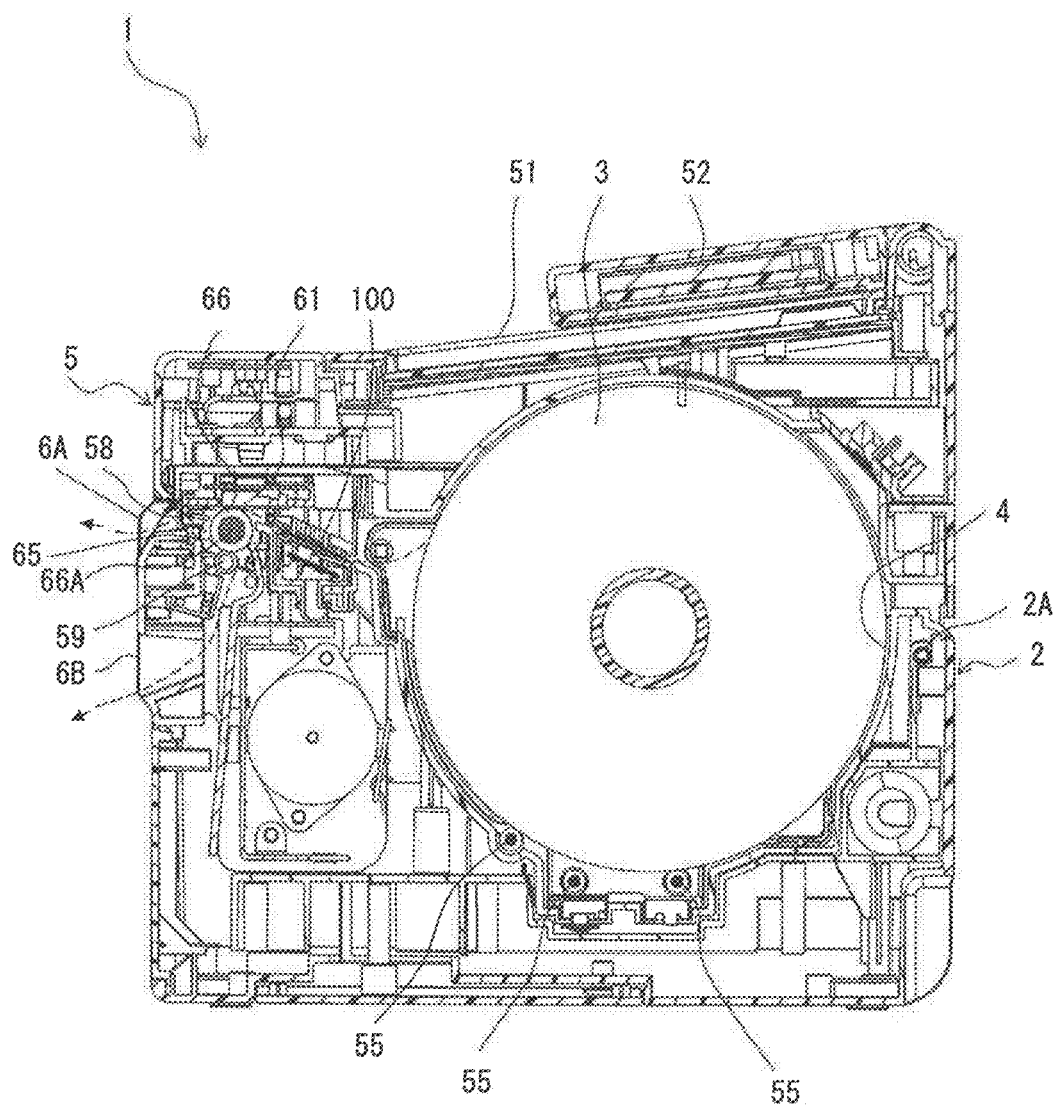
FIG. 3 is a cross-sectional view of the tape printer.

As shown in FIG. 2 and FIG. 3, the tape printer 1 has a recessed roll storage portion 4 that is provided to the rear of the internal space in the housing 2. The roll storage portion 4 is configured to house a roll 3, on which a print tape 30 is wound in a roll form. In a state in which a winding center line of the tape 30 extends in the left-right direction, the roll 3 that is housed in the roll storage portion 4 can rotate around an axis that extends in the left-right direction. A plurality of support rollers 55 are provided in a bottom surface portion of the roll storage portion 4. The plurality of support rollers 55 are configured to be driven to rotate by coming into contact with an outer peripheral surface of the tape 30 that is pulled from the roll 3 when a platen roller 66 is rotationally driven.

Figure 5:
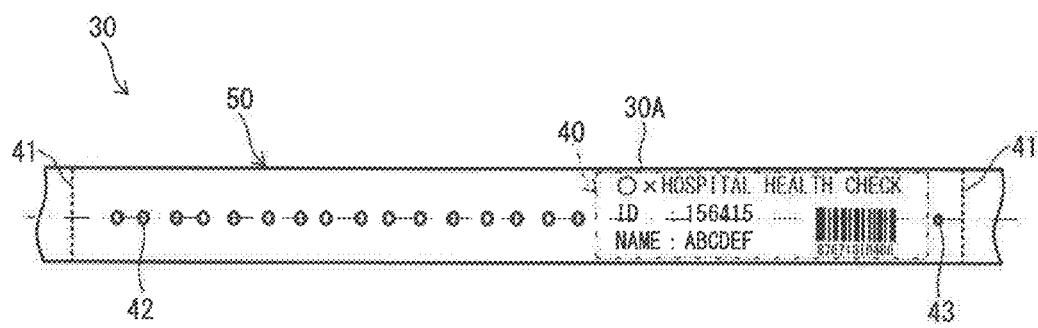
FIG. 5 is a front view of a tape according to a first embodiment.
Figure 6:
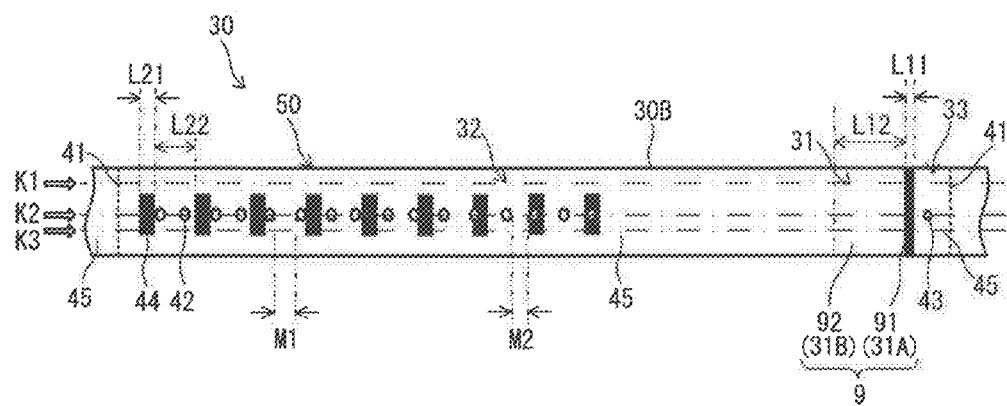
FIG. 6 is a back view of the tape according to the first embodiment.

The two surfaces of the tape 30 are a print surface 30A and a reverse surface 30B (refer to FIG. 5 and FIG. 6). The print surface 30A includes a print area 40 (refer to FIG. 5). The print area 40 is an area in which one or more characters (letters, numerals, graphics etc.) are printable. The reverse surface 30B includes a reference portion 31 (refer to FIG. 6), which is an area that is configured to identify a position of the print area 40. The tape 30 is wound in a roll form on the roll 3 such that the print surface 30A faces outward in the radial direction (in other words, such that the reverse surface 30B faces inward in the radial direction).

A pair of guide members 20A and 20B, which are positioned facing each other in the left-right direction, are provided in the roll storage portion 4. Each of the guide members 20A and 20B is a plate-shaped member that is configured to come into contact, respectively, with both end faces 3R and 3L of the roll 3. The user adjusts the positions of the guide members 20A and 20B in the left-right direction in accordance with the width of the roll 3 housed in the roll storage portion 4 (namely, the tape width of the tape 30). In this manner, the guide members 20A and 20B sandwich, from both the left and the right sides, the roll 3 that is housed in the roll storage portion 4 and guide, in the width direction, the tape 30 that is pulled from the roll 3.

A print head 61 is provided on the lower side of the front end portion of the top cover unit 5. The platen roller 66 is provided on the upper side of the front end portion of the housing 2, in a position facing the print head 61 in the up-down direction. A roller shaft 66A of the platen roller 66 is axially supported, such that it can freely rotate, by brackets 65, which are provided on both ends in the axial direction. When the top cover unit 5 is closed with respect to the housing 2, the tape 30, which is on a feed path, is clamped between the print head 61 and the platen roller 66. In this manner, a state is obtained in which the print head 61 can print on the tape 30. Further, a gear (not shown in the drawings) that is fixed to the roller shaft 66A meshes with a gear train (not shown in the drawings) on the housing 2 side. In this way, a state is obtained in which a feed motor 214 (refer to FIG. 4) can rotate the platen roller 66.

A release plate 58 is provided further to the front than the platen roller 66. The release plate 58 peels off a release layer from the printed tape 30 when the tape 30 is a label tape that has a three-layer structure of a print layer, an adhesive layer and the release layer. A pinch roller 59 is provided below the platen roller 66. The release layer, which has been folded back and downward by the release plate 58, is fed by being pinched between the pinch roller 59 and the platen roller 66.

In a state in which the top cover unit 5 is closed with respect to the housing 2, the user instructs the start of printing using the touch panel 51. As the feed motor 214 rotationally drives the platen roller 66, the tape 30 is pulled out from the roll 3 while being guided by the guide members 20A and 20B. After the pulled out tape 30 has been printed by the print head 61, the tape 30 is discharged to the outside of the housing 2 (refer to an alternate long and short dashed line in FIG. 3) from the first discharge opening 6A, via the release plate 58. The printed tape 30 is cut by the cutting blade 8.

When the tape 30 is the label tape, the release layer is peeled away from the printed tape 30 by the release plate 58. The release layer that has been peeled away from the tape 30 is discharged to the outside of the housing 2 (refer to a dotted line in FIG. 3) from the second discharge opening 6B by the pinch roller 59. Meanwhile, the print layer and the adhesive layer of the tape 30 are cut by the cutting blade 8 (refer to the alternate long and short dashed line in FIG. 3) after being discharged to the outside of the housing 2 from the first discharge opening 6A.

A reflective sensor 100 will be explained with reference to FIG. 2 and FIG. 3. The reflective sensor 100 is arranged on a sensor arrangement portion 102. The sensor arrangement portion 102 is a recessed portion formed between the platen roller 66 and the roll storage portion 4. A reflective surface 101 is a surface portion formed in a specific color (black, for example). The reflective surface 101 is provided on the bottom surface of the top cover unit 5, on an upstream side in a feed direction of the print head 61. When the top cover unit 5 is closed with respect to the housing 2, the reflective sensor 100 and the reflective surface 101 face each other with the feed path of the tape 30 being interposed therebetween.

In a similar manner to a known reflective sensor, the reflective sensor 100 has a light emitting portion and a light receiving portion that are not shown in the drawings. The light emitting portion irradiates detection light toward the reflective surface 101. When the tape 30 is on the feed path, the irradiated detection light is reflected back by the tape 30 and the reflected light is received by the light receiving portion.

When the tape 30 is not on the feed path, the irradiated detection light is reflected back by the reflective surface 101 and the reflected light is received by the light receiving portion. The amount of light received by the light receiving portion (hereinafter referred to as amount of reflected light) is different according to whether the detection light is reflected back by the tape 30 or the reflective surface 101. Further, the amount of reflected light is different depending on a color of the portion of the tape 30 onto which the detection light is irradiated.

A CPU 201 (refer to FIG. 4) of the tape printer 1 determines that a detected position is white when the amount of reflected light is equal to or more than a predetermined threshold value. The CPU 201 determines that the detected position is black when the amount of reflected light is less than the predetermined threshold value. In other words, The CPU 201 can detect a pattern which is represented by white and black stripes (a one-dimensional code). When a detected pattern matches a reference code 9 (refer to FIG. 6), the CPU 201 determines that the reference portion 31 has been detected. The reference code 9 is an indicator representing the reference portion 31. The CPU 201 performs various print controls based on the detected reference portion 31. For example, the CPU 201 identifies the position of the print area 40 (refer to FIG. 5) based on the detected reference portion 31. When the CPU 201 has fed the tape 30 to a position at which the print area 40 faces the print head 61, the CPU 201 starts printing by the print head 61.

The reflective sensor 100 is configured to move within the sensor arrangement portion 102, along the width direction (the left-right direction in the present embodiment) of the tape 30. The width direction is orthogonal to the feed direction of the tape 30. After the user has housed the roll 3 in the roll storage portion 4, the user adjusts the position of the reflective sensor 100 in the left-right direction such that it matches the position in the width direction of the reference portion 31. In this manner, the tape printer 1 can detect the reference portion 31 using the reflective sensor 100 irrespective of the tape 30 having differing tape widths.

Figure 4:
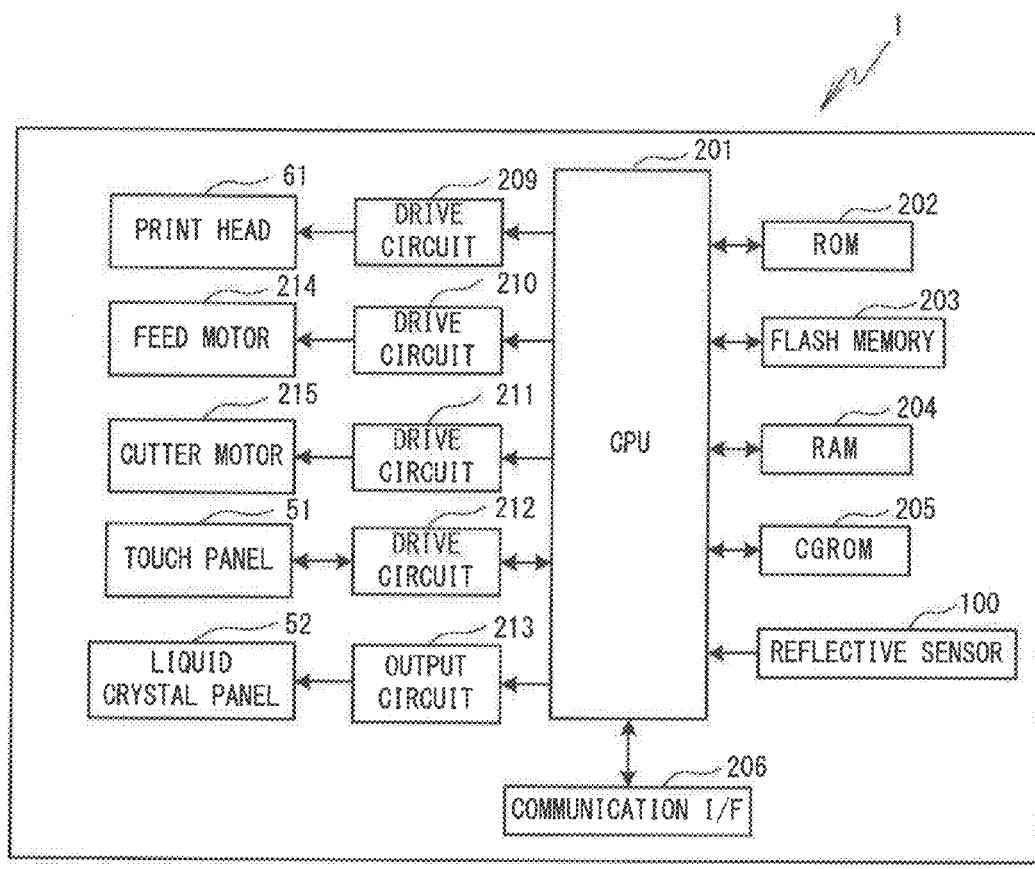
FIG. 4 is a block diagram showing an electrical configuration of the tape printer.

An electrical configuration of the tape printer 1 will be explained with reference to FIG. 4. The tape printer 1 is provided with the CPU 201 that performs control of the tape printer 1. The CPU 201 is connected to a ROM 202, a flash memory 203, a RAM 204, a CGROM 205, a communication IF 206, drive circuits 209 to 212, an output circuit 213 and the reflective sensor 100.

Figure 7:
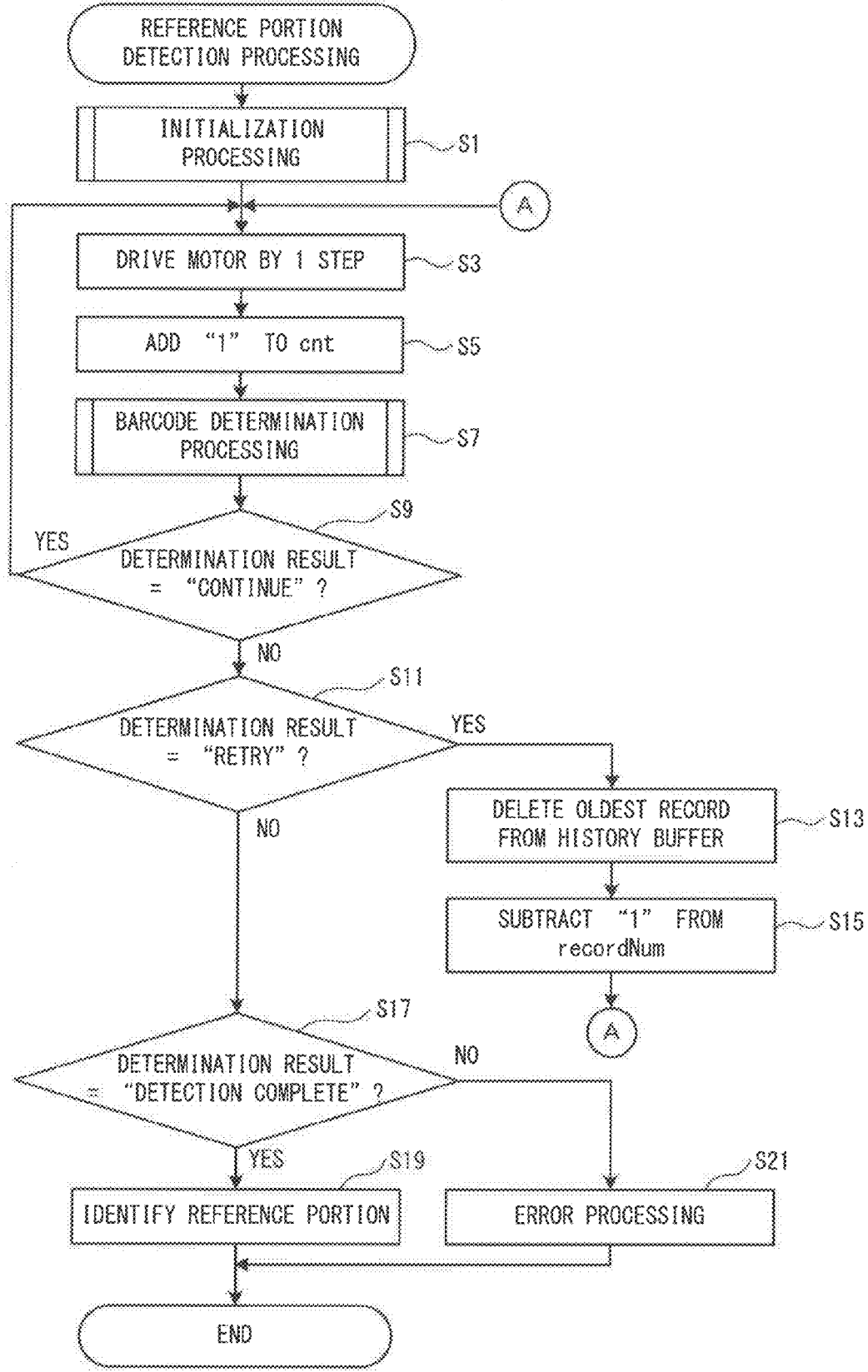
FIG. 7 is a flowchart of reference portion detection processing.

Various programs that are executed by the CPU 201 (such as a program for reference portion detection processing shown in FIG. 7) are stored in the ROM 202. The above-described threshold value and code information that will be explained later are stored in the flash memory 203. Depending on various conditions (such as the type of the tape 30, the usage environment of the tape printer 1 etc.), the user can change the threshold values stored in the flash memory 203 within a specific range (an allowable threshold range). Temporary data, including various variables that will be explained later, are stored in the RAM 204. Dot pattern data, which are used to print text that is target of printing on the tape 30, are stored in the CGROM 205.

The drive circuit 209 is an electronic circuit to drive the print head 61. The drive circuit 210 is an electronic circuit to drive the feed motor 214. The drive circuit 211 is an electronic circuit to drive a cutter motor 215 that operates the cutting blade 8. The drive circuit 212 is an electronic circuit to drive the touch panel 51. The output circuit 213 is an electronic circuit that performs display control of the liquid crystal panel 52.

2. Tape 30 According to First Embodiment

The tape 30 according to a first embodiment will be explained with reference to FIG. 5 and FIG. 6. The tape 30 of the present embodiment is a long tape that is used to print and create a wrist band 50, and has a single layer structure formed of a white paper sheet. A plurality of the wrist bands 50 are continuously provided in the lengthwise direction of the tape 30. The lengthwise direction of the tape 30 is the same as the feed direction of the tape 30. Perforations 41 are provided across the whole of the short side direction of the tape 30 at positions of connections between the wrist bands 50 that are adjacent to each other on the tape 30. The short side direction of the tape 30 is the same as the width direction of the tape 30.

A plurality of adjustment holes 42 and a single fixing hole 43, which penetrate the tape 30 in the thickness direction, are formed in advance in each of the wrist bands 50. The adjustment holes 42 are provided on the downstream side in the feed direction of the wrist band 50 (the left side in FIG. 5 and FIG. 6) such that they are aligned in the feed direction with an interval therebetween. The single fixing hole 43 is provided on the upstream side in the feed direction of the wrist band 50 (the right side in FIG. 5 and FIG. 6). The adjustment holes 42 and the fixing hole 43 are provided in a center portion, in the width direction, of the wrist band 50. In the present embodiment, the adjustment holes 42 and the fixing hole 43 are round holes with a diameter of 3 mm, and sixteen of the adjustment holes 42 are aligned in the feed direction at a uniform interval (an interval of 10 mm, for example).

As shown in FIG. 5, the print area 40 is provided on the print surface 30A of the tape 30 for each of the wrist bands 50. The print area 40 is a rectangular white area that is longer in the feed direction and is provided between the adjustment holes 42 and the fixing hole 43. The wrist bands 50, on each of which various information is printed on the print area 40, are separated from the tape 30 using the perforations 41. By fixing the fixing hole 43 and one of the adjustment holes 42 using a fastener that is not shown in the drawings, the user can wear the wrist band 50 around his or her arm. By changing the adjustment hole 42 that is fixed using the fastener, the user can adjust the winding diameter of the wrist band 50.

As shown in FIG. 6, the reference portion 31 and non-reference portions 32 and 33 are provided on the reverse surface 30B of the tape 30 for each of the wrist bands 50. The non-reference portion 32 is an area in which the plurality of adjustment holes 42 are formed, and is provided on the downstream side in the feed direction with respect to the reference portion 31. The non-reference portion 33 is provided on the upstream side in the feed direction with respect to the reference portion 31, and is an area in which the fixing hole 43 is formed. In other words, the reference portion 31 is provided between the non-reference portions 32 and 33 in the feed direction.

The reference portion 31 includes the reference code 9 that is at least longer than each of the adjustment holes 42 and the fixing hole 43 in the width direction. The reference code 9 is a barcode which is longer in the width direction than a first area 44 (to be explained later). The reference code 9 is formed by a plurality of identification marks arranged in line in the feed direction in a specific order, without gaps between the identification marks. Each of the identification marks is one of a first mark 31A and a second mark 31B. The first mark 31A is a portion of a first color that is one of white or black. The second mark 31B is a portion of a second color that is the other one of the white and the black. In the present embodiment, the first color is black and the second color is white. In other words, the first mark 31A is a black portion that is printed in advance on the tape 30 on the reference portion 31. The second mark 31B is the portion of the reference portion 31 other than the first mark 31A and is a non-colored portion of the tape 30.

The reference code 9 of the present embodiment includes a main mark 91 and a stability mark 92, and extends across an entire width of the tape 30. The main mark 91 is the first mark 31A that has a prescribed length in the feed direction (hereinafter referred to as a length L11). The main mark 91 indicates an origin position that is used by the tape printer 1 to identify the print area 40. The stability mark 92 is the second mark 31B that has a prescribed length in the feed direction (hereinafter referred to as a length L12). The stability mark 92 is provided on the upstream or the downstream side of the main mark 91 in the feed direction, and is an indicator portion that is used by the tape printer 1 to identify the main mark 91. The stability mark 92 of the present embodiment has the longest length in the feed direction of the identification marks that are included in the reference code 9, and is adjacent to the main mark 91 on the downstream side of the main mark 91 in the feed direction.

The length L12 of the stability mark 92 is larger than the length L11 of the main mark 91. Further, the length L12 is larger than a distance M1 (10 mm in the present embodiment). The distance M1 is the distance between two of the adjustment holes 42 that are adjacent to each other in the feed direction. The length L12 is also larger than a distance M2 (8 mm in the present embodiment). The distance M2 is the distance between one of the adjustment holes 42 and the first area 44 that will be explained later, the adjustment hole 42 being adjacent to the first area 44 in the feed direction.

With the above-described tape printer 1 (refer to FIG. 4), each time the feed motor 214 feeds the tape 30 by one step (0.1 mm, for example), the reflective sensor 100 performs color detection for the one step. As an example, the length L11 of the main mark 91 is a feed distance (that is, 4 mm) that corresponds to 40 steps of color detection. The length L12 of the stability mark 92 is a feed distance (that is, 24 mm) that corresponds to 240 steps of color detection. Thus, the length L12 is larger than each of the length L11 and the distances M1 and M2.

The non-reference portion 32 includes the first area 44 and a second area 45. The first area 44 is a portion of the same first color as the first mark 31A. The second area 45 is a portion of the same second color as the second mark 31B. In the present embodiment, the first area 44 is a black portion that is printed in advance on the tape 30 in the non-reference portion 32. The second area 45 is a portion of the non-reference portion 32 other than the first area 44, and is a non-colored portion of the tape 30. Presupposing that each of the adjustment holes 42 is a portion indicating both black and white, the layout, the length in the feed direction and the shape etc. of the first area 44 and the second area 45 are prescribed such that the non-reference portion 32 has a color arrangement in which the reference code 9 is not included in the feed direction.

At least one of the first areas 44 is provided with respect to each of at least one of the adjustment holes 42. The at least one of the first areas 44 is respectively provided on at least one of the upstream side and the downstream side in the feed direction with respect to one of the adjustment holes 42. The first area 44 is longer, in the width direction, than the adjustment hole 42 that is adjacent to the first area 44 in the feed direction. Further, the length of the first area 44 in the feed direction (hereinafter referred to as a length L21) is larger than the length L11 of the main mark 91. A distance L22 is the distance between two of the first areas 44 that are adjacent to each other in the feed direction. The distance L22 is different than the length L12 of the stability mark 92.

In the present embodiment, nine of the first areas 44 are aligned in the feed direction at a uniform interval (an 18 mm interval, for example). In other words, the distance L22 is 18 mm, which is different in size to the length L12 (namely, 24 mm). Each of the first areas 44 is a rectangular black portion that is longer in the width direction and is arranged in a central portion, in the width direction, of the tape 30. The length L21 of each of the first areas 44 is 8 mm, which is larger than the length L11 (namely, 4 mm). Each of the first areas 44 is formed such that it is adjacent, in the lengthwise direction, to one of the adjustment holes 42, or such that part or all of the adjustment holes 42 is formed inside the first area 44.

Of the non-reference portion 33, a portion other than the fixing hole 43 is the second area 45. Thus, the second area 45 included in the non-reference portion 33 is connected to the second area 45 included in the non-reference portion 32 (which is provided on the upstream side of the non-reference portion 33 in the feed direction) on either side of the perforations 41.

3. Reference Portion Detection Processing

Reference portion detection processing of the tape printer 1 will be explained with reference to FIG. 7 to FIG. 11. The reference portion detection processing is processing to detect the reference portion 31 from the tape 30. For example, when the user instructs the tape printer 1 to start printing, the CPU 201 reads out the program stored in the ROM 202 and executes the reference portion detection processing. As shown in FIG. 7, in the reference portion detection processing, first initialization processing is performed (step S1).

Figure 8:
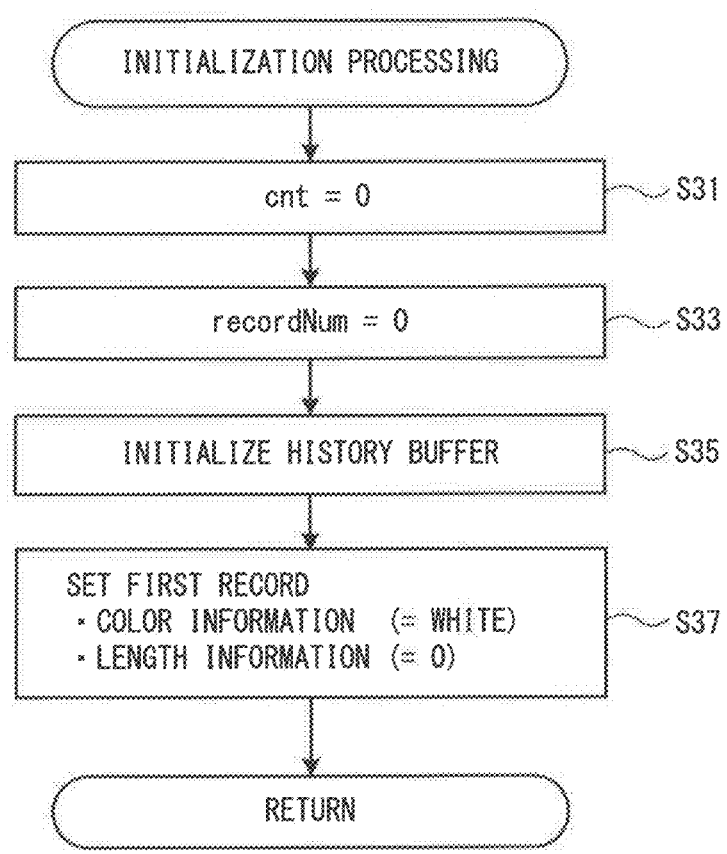
FIG. 8 is a flowchart of initialization processing.

As shown in FIG. 8, in the initialization processing (step S1), a feed counter cnt that is stored in the RAM 204 is initialized to "0" (step S31). The feed counter cnt is a variable that indicates a number of steps by which the feed motor 214 has fed the tape 30 (namely, a feed amount of the tape 30). A record number recordNum that is stored in the RAM 204 is initialized to "0" (step S33). The record number recordNum is a variable indicating a number of records, which represent patterns detected by the reflective sensor 100. Each record is provided for each of a same color area that is an area in which the same color, on the tape 30, continues in the feed direction. The same color area is a detected pattern that is detected for a continuous same color. Each record includes color information and length information. The color information indicates whether the same color area is black or white. The length information indicates a number of steps corresponding to a length, in the feed direction, of the same color area.

A history buffer (not shown in the drawings) that is provided in the RAM 204 is initialized (step S35). The history buffer is a storage area in which the records are stored. In the history buffer, an identification number is assigned to each of the records, in the order in which the records are stored, from "1" in ascending order. The first record is set in the initialized history buffer (step S37). The first record includes color information indicating "white" and length information indicating "0." After that, the processing returns to the reference portion detection processing (FIG. 7).

As shown in FIG. 7, after the processing is performed at step S1, the feed motor 214 is driven by one step, and the tape 30 is fed by a specific distance (0.1 mm in the present embodiment) (step S3). "1" is added to the feed counter cnt (step S5). Barcode determination processing, which determines whether or not the reference code 9 has been detected, is performed (step S7).

Figure 9:
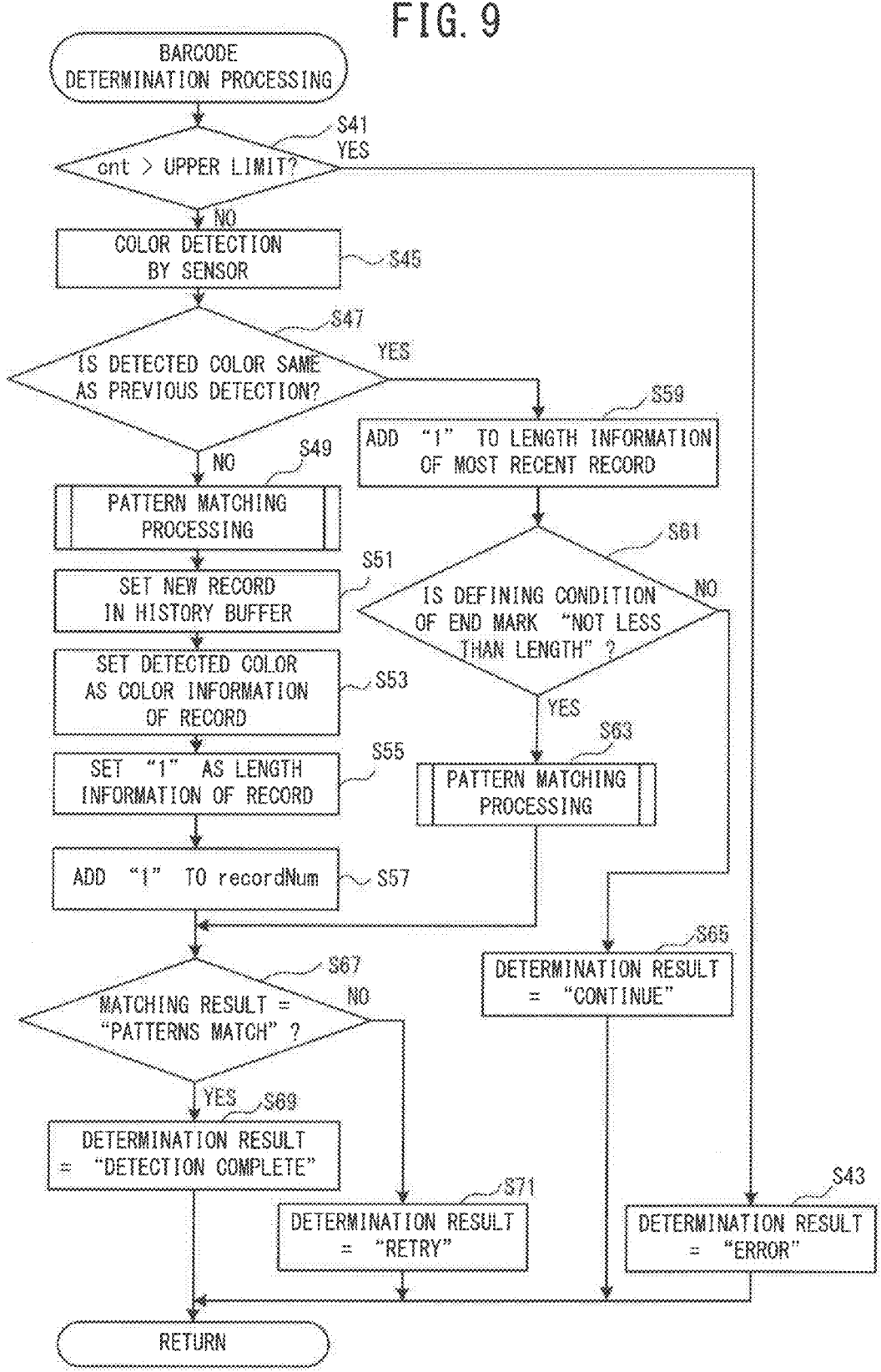
FIG. 9 is a flowchart of barcode determination processing.

As shown in FIG. 9, in the barcode determination processing (step S7), a determination is made as to whether or not the feed counter cnt is larger than an upper limit (step S41). For example, the upper limit is a number of the steps of the feed motor 214 that corresponds to the length in the feed direction of the wrist band 50. When the feed counter cnt is larger than the upper limit (yes at step S41), this means that the feed amount of the tape 30 has exceeded the length in the feed direction of the wrist band 50, and thus "Error" is set as a determination result (step S43).

When the feed counter cnt is equal to or less than the upper limit (no at step S41), color detection by the reflective sensor 100 is performed (step S45). At step S45, based on the amount of reflected light of the detection light irradiated onto the tape 30 that is being fed by one step and on the threshold value stored in the flash memory 203, one of either white or black is detected. A determination is made as to whether or not the detected color is the same as the color detected at the previous step S45 (step S47).

When the detected color is not the same as that detected the previous step S45 (no at step S47), this indicates that the color detected by the reflective sensor 100 has changed. In other words, a detection position of the reflective sensor 100 has passed beyond an upstream side end portion, in the feed direction, of the same color area. In this case, pattern matching processing (to be explained later), which matches an acquired detected pattern with the reference code 9, is performed (step S49). After the processing is performed at step S49, a new record is set in the history buffer (step S51). The color detected at step S45 is set as the color information of the newly set record (step S53). "1" is set as the length information of the newly set record (step S55). "1" is added to the record number recordNum (step S57).

On the other hand, when the detected color is the same as the previous step S45 (yes at step S47), this indicates that the color detected by the reflective sensor 100 has not changed. In other words, the detection position of the reflective sensor 100 has not passed beyond the upstream side end portion, in the feed direction, of the same color area. In this case, "1" is added to the length information of the most recent record stored in the history buffer (step S59). Next, a determination is made as to whether or not a defining condition (to be explained in more detail later) of an end mark of the reference code 9 is "Not less than length" (step S61). It should be noted that, among the plurality of identification marks included in the reference code 9, the end mark is the identification mark that is arranged on the most upstream side in the feed direction.

When the defining condition of the end mark is "Not less than length," (yes at step S61), even if the length in the feed direction of the same color area that is currently being detected has not been defined, an execution condition of length matching processing (step S91), which will be explained later, is satisfied. In this case, the pattern matching processing is performed (step S63), which is the same as that at step S49. On the other hand, when the defining condition of the end mark is "Same length" (no at step S61), if the length in the feed direction of the same color area currently being detected has not been defined, the execution condition of the length matching processing (step S91, to be explained later) is not satisfied. In this case, "Continue" is set as the determination result (step S65).

Figure 10:
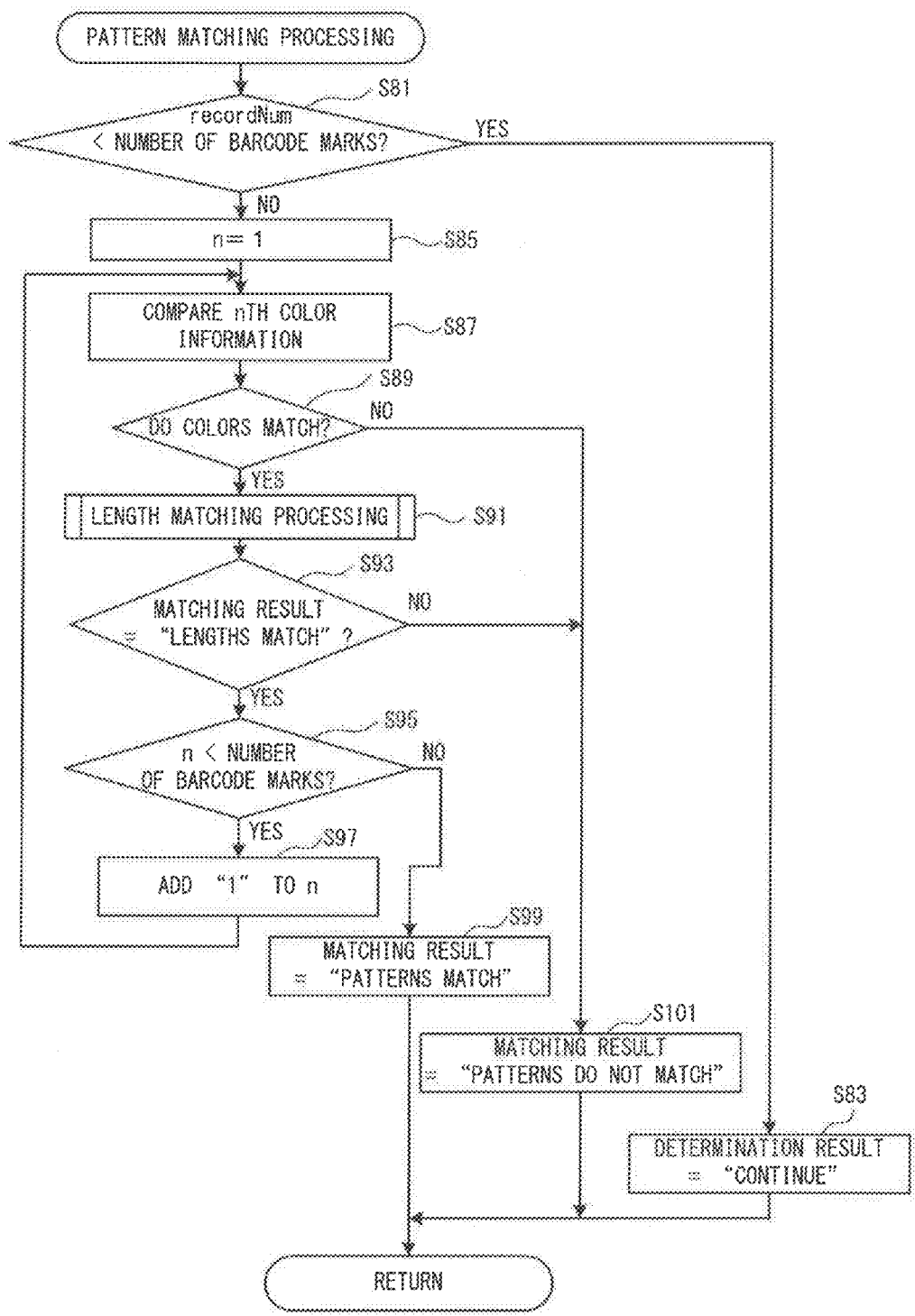
FIG. 10 is flowchart of pattern matching processing.

As shown in FIG. 10, in the pattern matching processing (step S49 or step S63), a determination is made as to whether or not the record number recordNum is less than the number of marks of the reference code 9 (step S81). The number of marks of the reference code 9 is the number of the plurality of identification marks included in the reference code 9.

In the present embodiment, code information that is used to identify the reference code 9 is stored in advance in the flash memory 203. The code information includes: the number and the layout of the plurality of identification marks included in the reference code 9; the color information that indicates whether each of the identification marks is white or black; the length information that indicates the length in the feed direction of each of the identification marks; and the defining condition (to be explained later) of each of the identification marks. In the code information, the identification numbers are assigned to the plurality of identification marks that are aligned from the downstream side toward the upstream side in the feed direction, starting from the number "1" in ascending order. By referring to the code information of the flash memory 203, the CPU 201 can identify the number of marks in the reference code 9, and the order, the color information, the length information and the defining condition of each of the identification marks.

When the record number recordNum is less than the number of marks of the reference code 9 (yes at step S81), "Continue" is set as a determination result (step S83), since a number of the detected patterns necessary for matching with the reference code 9 is insufficient. On the other hand, when the record number recordNum is equal to or more than the number of marks of the reference code 9 (no at step S81), the same number of detected patterns or a greater number of detected patterns than the number of marks is stored in the history buffer. In this case, a variable n that is stored in the RAM 204 is initialized to "1" (step S85).

Next, the color information of the nth record stored in the history buffer (namely, of the record having the same number as the variable n) is compared with the color information of an nth identification mark (hereinafter referred to as the nth mark) included in the reference code 9 (step S87). Based on a result of the comparison at step S87, a determination is made as to whether or not the color indicated by the color information of the nth record matches the color indicated by the color information of the nth mark (step S89). When the colors match (yes at step S89), the length matching processing, which matches the lengths in the feed direction based on the nth record and the nth mark, is performed (step S91).

Figure 11:
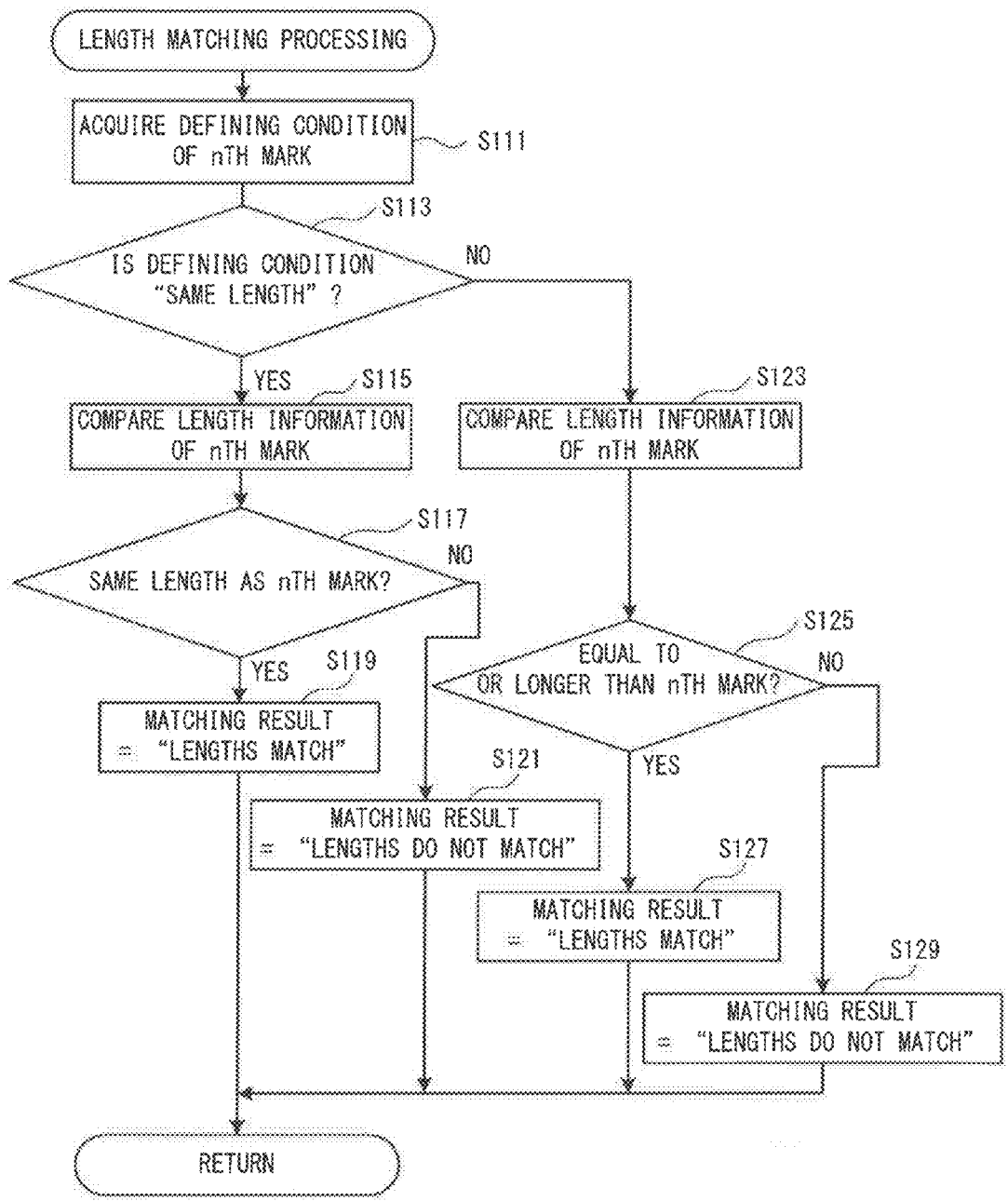
FIG. 11 is a flowchart of length matching processing.

As shown in FIG. 11, in the length matching processing (step S91), the defining condition of the nth mark is acquired by referring to the code information stored in the flash memory 203 (step S111). In the code information stored in the flash memory 203, one of "Same length" and "Not less than length" is set as the defining condition of each of the identification marks.

When the defining condition acquired at step S111 is "Same length" (yes at step S113), the length information of the nth record is compared with the length information of the nth mark (step S115). Based on a result of the comparison at step S115, a determination is made as to whether or not the length in the feed direction indicated by the length information of the nth record is the same as the length in the feed direction indicated by the length information of the nth mark (step S117). For example, when the length in the feed direction of the nth record is within a range of 0.8 to 1.2 with respect to the length in the feed direction of the nth mark, it is determined that the lengths in the feed direction are the same (yes at step S117). In this case, "Lengths match" is set as a matching result (step S119). On the other hand, when the lengths in the feed direction are not the same (no at step S117), "Lengths do not match" is set as the matching result (step S121).

When the defining condition acquired at step S111 is "Not less than length" (no at step S113), the length information of the nth record is compared with the length information of the nth mark (step S123). Based on a result of the comparison at step S123, a determination is made as to whether or not the length in the feed direction indicated by the length information of the nth record is equal to or more than the length in the feed direction indicated by the length information of the nth mark (step S125). When the length in the feed direction of the nth record is equal to or longer than the length in the feed direction of the nth mark (yes at step S125), "Lengths match" is set as the matching result (step S127). On the other hand, if the length in the feed direction of the nth record is less than the length in the feed direction of the nth mark (no at step S125), "Lengths do not match" is set as the matching result (step S129). After the processing is performed at one of step S119, step S121, step S127 and step S129, the processing returns to the pattern matching processing (FIG. 10).

As shown in FIG. 10, after the processing is performed at step S91, a determination is made as to whether or not the matching result is "Lengths match" (step S93). When the matching result is "Lengths match" (yes at step S93), a determination is made as to whether or not the variable n is less than the number of marks of the reference code 9 (step S95). When the variable n is less than the number of marks of the reference code 9 (yes at step S95), this indicates the presence of identification marks for which the determination has not been made. In this case, "1" is added to the variable n (step S97) and the processing returns to step S87. In this manner, the processing at step S87 to step S97 is repeatedly performed until no more identification marks remain for which the determination has not been made.

When the variable n is equal to or more than the number of marks of the reference code 9 (no at step S95), no more identification marks remain for which the determination has not been made. In this case, since all of the identification marks included in the reference code 9 match the acquired detected pattern, "Patterns match" is set as a matching result (step S99). On the other hand, when the colors do not match (no at step S89) or when the matching result is "Lengths do not match" (no at step S93), "Patterns do not match" is set as the matching result (step S101). After the processing is performed at step S83, step S99 or step S101, the processing returns to the barcode determination processing (FIG. 9).

As shown in FIG. 9, after the processing is performed at step S57 or step S63, a determination is made as to whether or not the matching result is "Patterns match" (step S67). When the matching result is "Patterns match" (yes at step S67), "Detection complete" is set as a determination result (step S69). When the matching result is "Patterns do not match" (no at step S67), "Retry" is set as the determination result (step S71). After the processing is performed at step S43, step S65, step S69 or step S71, the processing returns to the reference portion detection processing (FIG. 7).

As shown in FIG. 7, after the processing is performed at step S7, a determination is made as to whether or not the determination result is "Continue" (step S9). When the determination result is "Continue" (yes at step S9), the processing returns to step S3. In this manner, the processing from step S3 to step S9 is repeatedly performed until the color detected by the reflective sensor 100 changes (no at step S47 in FIG. 9), or until the record number in the history buffer reaches the number of marks of the reference code 9 (no at step S81 in FIG. 10).

When the determination result is not "Continue" (no at step S9), a determination is made as to whether or not the determination result is "Retry" (step S11). When the determination result is "Retry" (yes at step S11), the oldest record is deleted from the history buffer (step S13). "1" is subtracted from the record number recordNum (step S15). After that, the processing returns to step S3. In this manner, in the next pattern matching processing (refer to FIG. 10), the records set in the history buffer are matched, in the order of the plurality of identification records included in the reference code 9, taking as a first record the next record that follows the previously determined record (that is, the detected pattern that is adjacent, on the upstream side in the feed direction, to the previously determined detected pattern).

When the determination result is not "Retry" (no at step S11), a determination is made as to whether or not the determination result is "Detection complete" (step S17). When the determination result is "Detection complete" (yes at step S17), the reference portion 31 is identified based on the detected reference code 9 (step S19). For example, the identification mark having the largest length in the feed direction within the reference code 9 is identified as the stability mark 92. The identification mark positioned on the upstream side of the stability mark 92 in the feed direction is identified as the main mark 91. In following printing control, for example, a boundary position between the main mark 91 and the stability mark 92 is used as the origin position for positioning the print head 61 with respect to the print area 40.

When the determination result is "Error" (no at step S17), error processing is performed (step S21), in which it is notified, for example, that the reference code 9 cannot be correctly detected. After the processing is performed at step S19 or step S21, the reference portion detection processing is ended.

4. Example of Detecting Reference Portion 31

An example that the tape printer 1 detects the reference portion 31 will be explained with reference to FIG. 6, FIG. 12 and FIG. 13. Code information of the tape 30 shown in FIG. 6 is stored in the flash memory 203. Specifically, the code information indicates that the two identification marks (the main mark 91 and the stability mark 92) are included in the reference code 9. For the stability mark 92 (which is the first identification mark), the code information indicates "White" as the color information, "24 mm" as the length information, and "Not less than length" as the defining condition. For the main mark 91 (which is the second identification mark), the code information indicates "Black" as the color information, "4 mm" as the length information, and "Same length" as the defining condition.

As described above, the threshold values stored in the flash memory 203 can be changed within the allowable threshold range. In FIG. 12 and FIG. 13, the threshold values stored in the flash memory 203 are exemplified by threshold values T1 and T2. The threshold value T1 is a threshold value that is relatively large within the allowable threshold range. The threshold value T2 is a threshold value that is relatively small within the allowable threshold range. Thus, it is easier to determine "Black," based on the amount of reflected light, using the threshold value T1 rather than the threshold value T2.

As described above, the position of the reflective sensor 100 in the width direction can be changed. As shown in FIG. 6, a position K1 in the width direction is located, on the tape 30, on a first end portion side (the upper side in FIG. 6), in the width direction, with respect to the plurality of first areas 44. A position K2 in the width direction is located in the central portion, in the width direction, of the tape 30. Irrespective of whether the reflective sensor 100 is in the position K1 or in the position K2 in the width direction, when the reference portion detection processing (refer to FIG. 7) is performed, the detection light of the reflective sensor 100 is irradiated onto the non-reference portion 32, the reference portion 31 and the non-reference portion 33, in that order, along with the feeding of the tape 30.

At that time, when the reflective sensor 100 is in the position K1 in the width direction, in the non-reference portion 32, the detection light is irradiated onto the second area 45 only. In the reference portion 31, the detection light is irradiated onto the stability mark 92 and the main mark 91 in that order. In the non-reference portion 33, the detection light is irradiated onto the second area 45 only. On the other hand, when the reflective sensor 100 is in the position K2 in the width direction, in the non-reference portion 32, the detection light is irradiated onto the adjustment holes 42, the first areas 44 and the second area 45. In the reference portion 31, the detection light is irradiated onto the stability mark 92 and the main mark 91 in that order. In the non-reference portion 33, the detection light is irradiated onto the fixing hole 43 and the second area 45.

Figure 12:
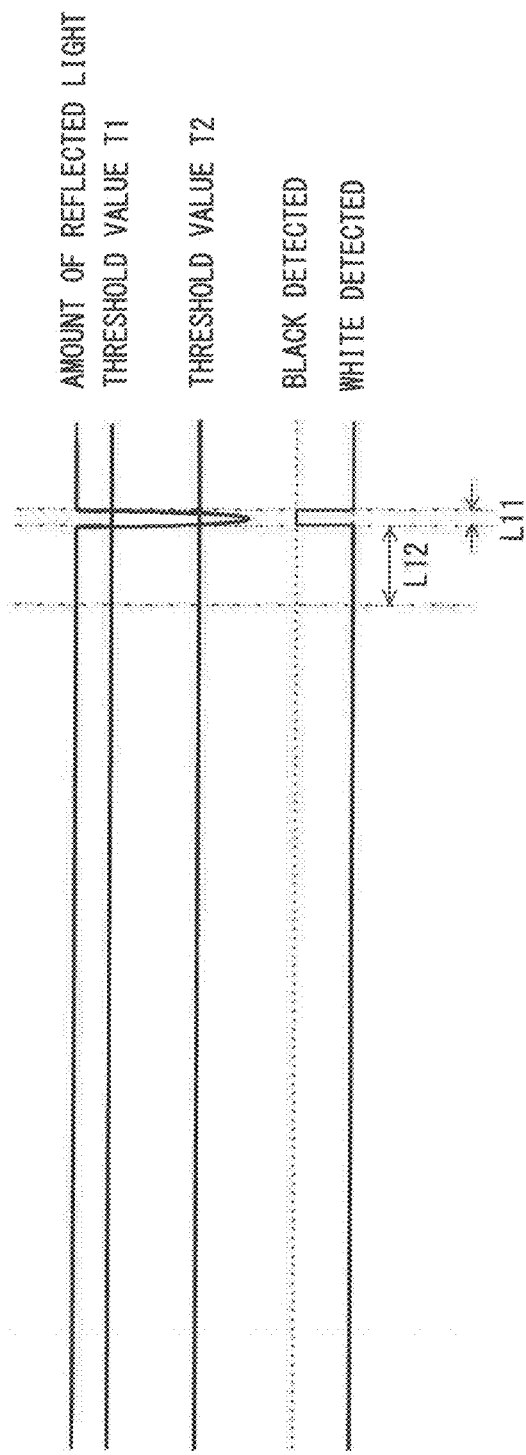
FIG. 12 is a first graph showing a waveform signal generated during color detection.

FIG. 12 shows a signal waveform detected in the above-described reference portion detection processing (refer to FIG. 7), when the reflective sensor 100 is in the position K1 in the width direction (refer to FIG. 6). Even when the color detection is performed based on either the threshold value T1 or the threshold value T2, based on the amount of reflected light of the detection light irradiated onto the second area 45 and the stability mark 92, white is detected. Based on the amount of reflected light of the detection light irradiated onto the main mark 91, black is detected.

In this case, in the pattern matching processing (refer to FIG. 10), the detected pattern of "White" based on the non-reference portion 32, the second area 45 and the stability mark 92 is matched with the stability mark 92 that is the first mark. Further, the detected pattern "Black" based on the main mark 91 is matched with the main mark 91 that is the second mark. In this manner, "Patterns match" is set as the matching result (step S99). In the barcode determination processing (refer to FIG. 8), "Detection complete" is set as the determination result (step S69). In the reference portion detection processing (refer to FIG. 7), the reference portion 31 is identified based on the detected reference code 9 (step S19).

Figure 13:
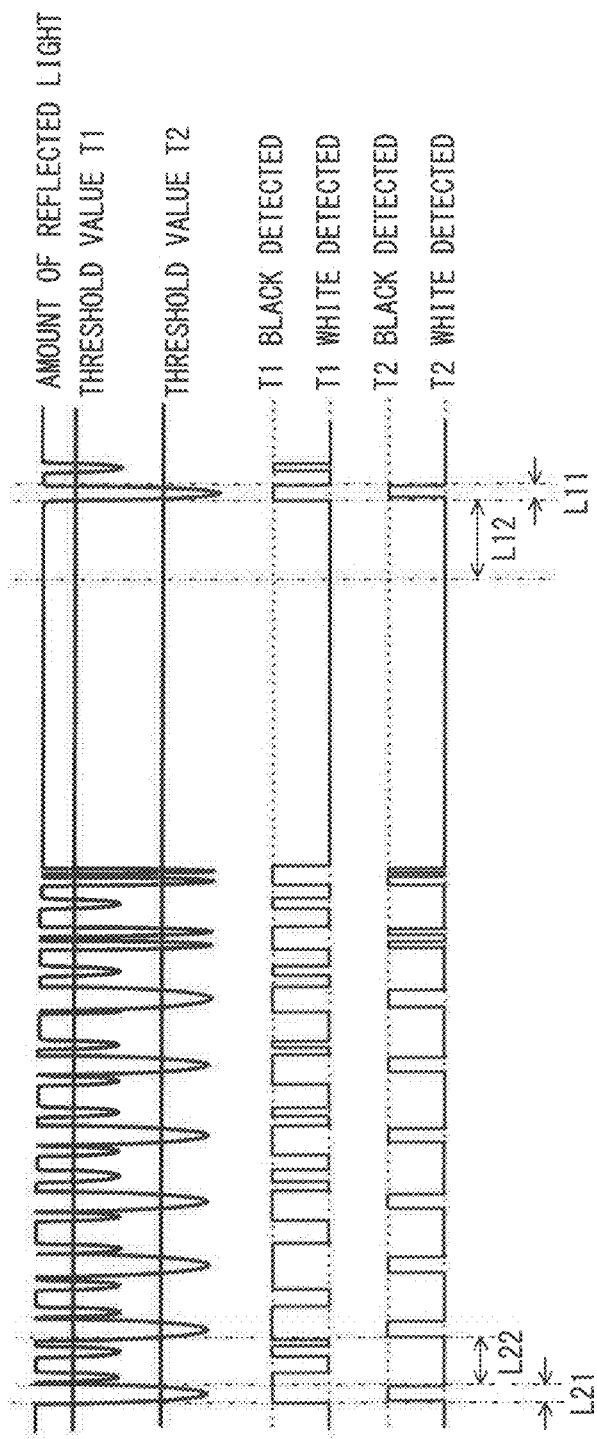
FIG. 13 is a second graph showing a waveform signal generated during color detection.

FIG. 13 shows a signal waveform detected in the above-described reference portion detection processing (refer to FIG. 7), when the reflective sensor 100 is in the position K2 in the width direction (refer to FIG. 6). Similarly to FIG. 12, even when the color detection is performed based on either the threshold value T1 or the threshold value T2, white is detected from the second area 45 and from the stability mark 92, and black is detected from the main mark 91. On the other hand, the detection light irradiated onto the adjustment holes 42 and the fixing hole 43 passes through the tape 30 in the thickness direction and is reflected back by the reflective surface 101 (refer to FIG. 2). Accordingly, the amount of reflected light detected falls between the threshold value T1 and the threshold value T2. When the color detection is performed based on the threshold value T1, black is detected based on the amount of reflected light from the adjustment holes 42 and the fixing hole 43. When the color detection is performed based on the threshold value T2, white is detected based on the amount of reflected light from the adjustment holes 42 and the fixing hole 43.

In the present embodiment, it is presupposed that each of the adjustment holes 42 is a portion indicating both black and white. The first areas 44 and the second area 45 are provided in a color arrangement in which the non-reference portion 32 does not include the barcode indicating the reference code 9 in the feed direction. In other words, even when each of the adjustment holes 42 is detected as either white or black, in the above-described reference portion detection processing (refer to FIG. 7), the same detected pattern as the reference code 9 is not detected from the non-reference portion 32. In this manner, in the tape printer 1, even when the color detection is performed based on either the threshold value T1 or the threshold value T2, the reference portion 31 is identified in the same manner as the example shown in FIG. 12.

5. Examples of Operations and Effects of First Embodiment

As explained above, the tape printer 1 is configured to identify the reference portion 31 by irradiating detection light onto the tape 30 that is fed in the lengthwise direction and detecting the reference code 9 based on the amount of reflected light. Even if the adjustment holes 42 have been respectively detected as the first color (black) or as the second color (white), the tape printer 1 can suppress the mistaken detection of the same white and black pattern as the reference code 9 from the non-reference portion 32. Therefore, while suppressing an increase in the complexity of the structure of the tape printer 1, the tape printer 1 can accurately detect the reference portion 31.

The reference code 9 includes the main mark 91. The length in the feed direction of the first area 44 is larger than the length in the feed direction of the main mark 91. Therefore, the detected pattern of the first area 44 does not match the length in the feed direction of the main mark 91. It is thus possible to inhibit the tape printer 1 from mistakenly detecting the first area 44 as the main mark 91.

The reference code 9 includes the stability mark 92. The stability mark 92 is in contact with the main mark 91 on the downstream or the upstream side of the main mark 91 in the feed direction. Further, the length in the feed direction of the stability mark 92 is larger than the main mark 91. Therefore, the tape printer 1 can detect the main mark 91 while using the stability mark 92 as a reference.

The length in the feed direction of the stability mark 92 is larger than the distance between two of the adjustment holes 42 that are adjacent in the feed direction. In the example shown in FIG. 13, when the color detection is performed based on the threshold value T1, all of the adjustment holes 42 are detected as the first color (black). The second area 45 that is arranged between the two adjustment holes 42 that are adjacent in the feed direction is detected as the same color area of the second color (white). The length in the feed direction indicated by the detected pattern of this same color area is smaller than the length in the feed direction of the stability mark 92. Therefore, it is possible to inhibit the tape printer 1 from mistakenly detecting the second area 45, which is arranged between the two adjustment holes 42 that are adjacent in the feed direction, as the stability mark 92.

The length in the feed direction of the stability mark 92 is larger than the distance between the adjustment hole 42 and the first area 44 that are adjacent to each other in the feed direction. In the example shown in FIG. 13, when the color detection is performed based on the threshold value T1, all of the adjustment holes 42 are detected as the first color (black). The second area 45 that is arranged between the adjacent adjustment hole 42 and first area 44 in the feed direction is detected as the same color area of the second color (white). The length in the feed direction indicated by the detected pattern of this same color area is smaller than the length in the feed direction of the stability mark 92. Therefore, it is possible to inhibit the tape printer 1 from mistakenly detecting the second area 45, which is arranged between the adjacent adjustment hole 42 and first area 44 in the feed direction, as the stability mark 92.

The plurality of first areas 44 are provided in the feed direction with an interval therebetween. The distance between two of the first areas 44 that are adjacent in the feed direction is different than the length in the feed direction of the stability mark 92. In the example shown in FIG. 13, when the color detection is performed based on the threshold value T2, all of the adjustment holes 42 are detected as the second color (white). The second area 45 and the adjustment holes 42 that are arranged between the two first areas 44 that are adjacent in the feed direction are detected as the same color area of the second color (white). The length in the feed direction indicated by the detected pattern of this same color area is smaller than the length in the feed direction of the stability mark 92. Therefore, it is possible to inhibit the tape printer 1 from mistakenly detecting the second area 45, which is arranged between the two first areas 44 that are adjacent in the feed direction, as the stability mark 92.

Further, in the example shown in FIG. 6, a position K3 in the width direction is located between the adjustment holes 42 and a second end portion (the end portion on the lower side in FIG. 6) of the first areas 44 in the width direction. When the reflective sensor 100 is in the position K3 in the width direction, in the non-reference portion 32, the detection light is irradiated onto the first areas 44 and the second area 45. In the reference portion 31, the detection light is irradiated onto the stability mark 92 and the main mark 91 in that order. In the non-reference portion 33, the detection light is irradiated onto the second area 45 only. In other words, the detection light is not irradiated onto the adjustment holes 42 and the fixing hole 43.

In this case, when the color detection is performed using either the threshold value T1 or the threshold value T2, the second area 45 that is arranged between the two first areas 44 that are adjacent in the feed direction is detected as the same color area of the second color (white). The length in the feed direction indicated by the detected pattern of this same color area is smaller than the length in the feed direction of the stability mark 92. Therefore, in a similar manner to that described above, it is possible to inhibit the tape printer 1 from mistakenly detecting the second area 45, which is arranged between the two first areas 44 that are adjacent in the feed direction, as the stability mark 92.

The first area 44 is longer in the width direction than the adjustment hole 42 that is adjacent to the first area 44 in the feed direction. The reference code 9 is longer in the width direction than the first area 44. Thus, when a position in the width direction of the tape 30 at which the detection light is irradiated (namely, the position in the width direction of the reflective sensor 100) is a position at which the detection light is irradiated onto the adjustment holes 42, the detection light is also reliably irradiated onto the first area 44 and the reference code 9. As a result, it is possible to inhibit the tape printer 1 from mistakenly detecting the reference code 9.

The reference code 9 extends over the whole of the tape 30 in the width direction. As a result, irrespective of the position in the width direction of the tape 30 at which the detection light is irradiated, the tape printer 1 can accurately detect the reference portion 31.

6. Tape 130 of Second Embodiment

Figure 14:
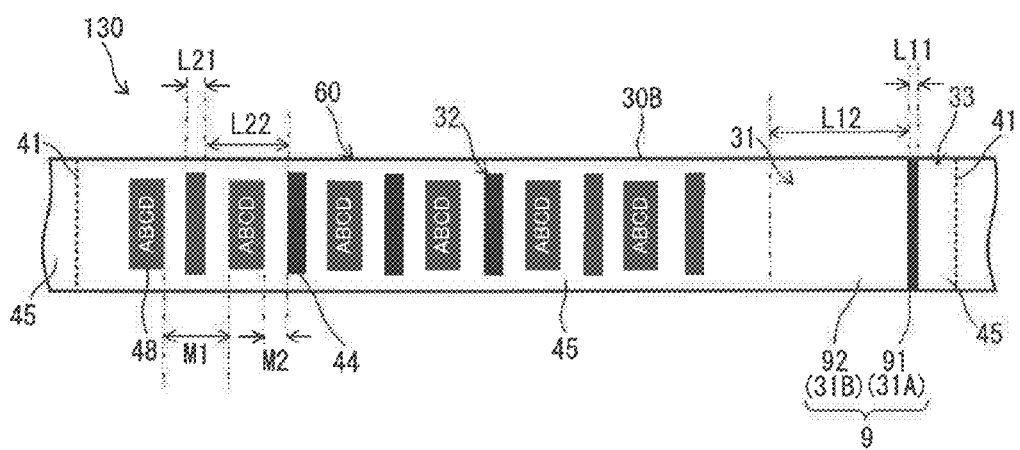
FIG. 14 is a back view of a tape according to a second embodiment.

A second embodiment of the present disclosure will be explained. In the following explanation, the same reference numerals will be assigned where the structure is the same as in the first embodiment, and an explanation thereof will be omitted here. As shown in FIG. 14, the tape 130 according to the second embodiment is the label tape with the three layer structure as described above. In the tape 130, a plurality of labels 60 are continuously provided in the lengthwise direction of the tape 130. The perforations 41 are provided at a position at which the adjacent labels 60 connect on the tape 130. Although not shown in the drawings, the print area 40 is provided for each of the labels 60 on the print surface 30A (refer to FIG. 5), which is the printing layer of the tape 130.

The reference portion 31 and the non-reference portions 32 and 33 are provided for each of the labels 60 on the reverse surface 30B, which is the release material layer of the tape 130. The reference portion 31 includes the reference code 9 in a similar manner to the first embodiment. Similarly to the first embodiment, the length L12 of the stability mark 92 (30 mm, for example) is larger than the length L11 of the main mark 91 (5 mm, for example). Note that, in contrast to the first embodiment, the fixing hole 43 (refer to FIG. 6) is not provided in the non-reference portion 33, and the whole of the non-reference portion 33 is the second area 45.

Similarly to the first embodiment, the non-reference portion 32 includes the first area 44 and the second area 45, but in contrast to the first embodiment, the adjustment holes 42 (refer to FIG. 6) are not provided in the non-reference portion 32. Similarly to the first embodiment, the length L21 of the first area 44 (8 mm, for example) is larger than the length L11 of the main mark 91. The distance L22 (20 mm, for example) between the two first areas 44 that are adjacent in the feed direction is different than the length L12 of the stability mark 92.

A plurality of print images 48 are provided in the non-reference portion 32. Each of the print images 48 is at least one of an area of a halftone between white and black (gray, for example) and an area of a complicated or detailed pattern. In the present embodiment, the print image 48 is a rectangular image with a gray background on which detailed characters are printed in white. In the example shown in FIG. 14, six of the print images 48 are arranged in the central portion, in the width direction, of the tape 130 and are aligned in the feed direction at a uniform interval.

With respect to each of the at least one of the plurality of print images 48, at least one of the first areas 44 is provided on the upstream side or the downstream side in the feed direction. The first area 44 is longer in the width direction than the print image 48 that is adjacent to the first area 44 in the feed direction. In the example shown in FIG. 14, the six first areas 44 are aligned at the uniform interval in the feed direction, such that each of the six first areas 44 is adjacent to one of the plurality of print images 48. The length L12 of the stability mark 92 is larger than the distance M1 (18 mm, for example) between two of the adjacent print images 48 in the feed direction. The length L12 is larger than the distance M2 (5 mm, for example) between the print image 48 and the first area 44 that are adjacent to each other in the feed direction.

In the tape printer 1, the reference portion detection processing (refer to FIG. 7) is performed on the tape 130 in a similar manner to the tape 30 of the first embodiment. The amount of reflected light from the print image 48 is smaller than the amount of reflected light from the white portion, and falls between the threshold value T1 and the threshold value T2. Thus, when the detection light is irradiated onto the print image 48, in a similar manner to when the detection light is irradiated onto the adjustment hole 42 (refer to FIG. 6), the color detected based on the amount of reflected light from the print image 48 (white or black) may be different depending on the threshold value used.

In the tape 130, presupposing that each of the plurality of print images 48 is a portion indicating both black and white, the first areas 44 and the second area 45 are provided in a color arrangement in which the non-reference portion 32 does not include the barcode indicating the reference code 9 in the feed direction. In other words, even when each of the plurality of print images 48 is detected as either white or black, in the above-described reference portion detection processing (refer to FIG. 7), the same detected pattern as the reference code 9 is not detected from the non-reference portion 32. Therefore, in the tape printer 1, the reference portion 31 is identified in the same manner as for the tape 30.

7. Comments Relating to Embodiments

The tapes 30 and 130 include a first color portion, which is a portion of the first color (black), a second color portion, which is a portion of the second color (white), and an unstable portion that will be described later. The first color portion is a portion in which the tape printer 1 can detect the first color (black) based on the amount of reflected light, irrespective of the threshold value used in the color detection. The second color portion is a portion in which the tape printer 1 can detect the second color (white) based on the amount of reflected light, irrespective of the threshold value used in the color detection. In the above-described embodiments, the main mark 91 and the first areas 44 are the first color portions and the stability mark 92 and the second area 45 are the second color portions.

The unstable portion is a portion in which the amount of reflected light is less than the threshold value or is equal to or more than the threshold value, depending on the magnitude of the threshold value used in the color detection. In the above-described embodiments, the adjustment holes 42 and the print images 48 are the unstable portions. In the tape printer 1, the larger the threshold value, the easier it is to detect one of the first color (black) and the second color (white) based on the amount of reflected light from the unstable portion. In the tape printer 1, the smaller the threshold value, the easier it is to detect the other one of the first color (black) and the second color (white) based on the amount of reflected light from the unstable portion.

Presupposing that the first areas 44 are not provided on the tapes 30 and 130, it is possible that the combination of the color detected from each of the plurality of unstable portions and the second color (white) detected from the second area 45 may match the barcode indicating the reference code 9. There is a possibility that the tape printer 1 may mistakenly detect the reference code 9 from the non-reference portion 32. Here, in the tapes 30 and 130, presupposing that each of the plurality of unstable portions is a portion indicating both the first color and the second color, the first areas 44 and the second area 45 are provided in a color arrangement in which the non-reference portion 32 does not include the barcode indicating the reference code 9 in the feed direction.

In the tape printer 1, the detection light is irradiated by the reflective sensor 100 onto the tapes 30 and 130 that are fed by the platen roller 66, and the amount of reflected light is measured (step S3 to step S7). Based on the measured amount of reflected light, a first continuous portion is detected (refer to FIG. 10). The first continuous portion is a portion in which the second color (white) is continuous for a predetermined length or more. Based on the measured amount of reflected light, a second continuous portion is detected (refer to FIG. 10). The second continuous portion is a portion in which the first color (black) is continuous within a predetermined range and which is adjacent in the feed direction to the first continuous portion. In the above-described embodiments, the stability mark 92, in which the second color (white) is continuous, is the first continuous portion. The main mark 91, in which the first color (black) is continuous, is the second continuous portion.

Characters are printed by the print head 61 on the print area 40 of the tapes 30 and 130 that are fed by the platen roller 66 based on the reference portion 31 that includes the detected first and second continuous portions (step S19). Therefore, the tape printer 1 need not be provided with a light emitting sensor that is separate to the reflective sensor 100, and the tape printer 1 can accurately detect the reference portion 31 irrespective of the magnitude of the threshold value used in the color detection. More specifically, the tape printer 1 can accurately detect the reference portion 31 while suppressing an increase in the complexity of the structure of the tape printer 1.

It should be noted that the first color and the second color may be any two colors as long as the tape printer 1 can distinguish between the colors irrespective of the threshold value. The first color is not limited to black and may be a color that is similar to black. The second color is not limited to white and may be a color that is similar to white. The first color may be white or a color that is similar to white and the second color may be black or a color that is similar to black. As explained in following modified examples, for example, the arrangement, the shape and the length in the feed direction of the first area 44 and the second area 45 can be changed as long as they are within a range that satisfies the above-described conditions.

8. Modified Examples

The present disclosure is not limited to the above-described embodiments, and various modifications are possible. Hereinafter, modified examples of the present disclosure are explained. In the following explanation, the same reference numerals will be assigned where the structure is the same as that of the tape 30 of the above-described embodiment, and an explanation thereof will be omitted here. Modified examples of the tape 30 will be exemplified, but the same modifications can be applied to the tape 130 by substituting the print images 48 for the adjustment holes 42.

Figure 15:
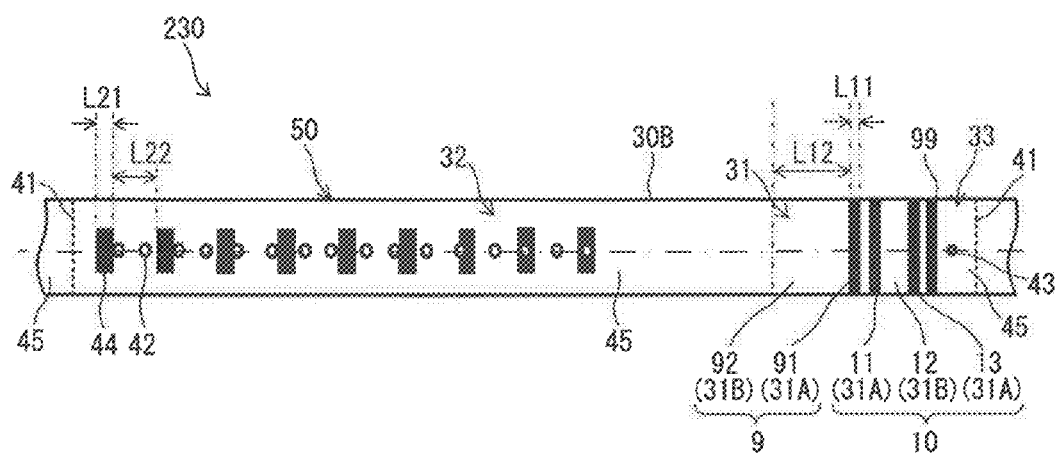
FIG. 15 is a back view of a tape according to a first modified example.

(1) The tape 30 may include a barcode that is different than the reference code 9. In a tape 230 that is shown in FIG. 15, the reference portion 31 includes the reference code 9, an ID code 10 and a boundary mark 99. Similarly to the reference code 9, the ID code 10 is a barcode that includes the first marks 31A and the second mark 31B as the plurality of identification marks. The ID code 10 indicates a type of the tape 230 (such as a material and tape width of the tape 230).

In the ID code 10 shown in FIG. 15, three identification marks 11 to 13 are aligned from the downstream side to the upstream side in the feed direction. The identification mark 11 is the first mark 31A that is positioned on the most downstream side in the feed direction in the ID code 10. The identification mark 13 is the first mark 31A that is positioned on the most upstream side in the feed direction in the ID code 10. The identification mark 12 is the second mark 31B that is arranged between the identification marks 11 and 13. The length in the feed direction of each of the identification marks 11 and 13 is 3 mm, and the length in the feed direction of the identification mark 12 is 9 mm.

The boundary mark 99 is the first mark 31A that has a prescribed length in the feed direction (4 mm, for example). The ID code 10 is provided on the upstream side in the feed direction of the reference code 9. The boundary mark 99 is provided on the upstream side in the feed direction of the ID code 10. In other words, the ID code 10 is provided between the main mark 91 and the boundary mark 99 in the feed direction. The boundary mark 99 is an indicator that indicates an area in which the ID code 10 is arranged.

In the tape printer 1, after the reference portion 31 has been detected by the reference portion detection processing (refer to FIG. 7), color detection is further performed by the reflective sensor 100 while the tape 230 is being fed. The black same color area that is adjacent to the main mark 91 on the upstream side in the feed direction is detected as the lead mark (the identification mark 11 in the example shown in FIG. 15) of the ID code 10. The black same color area that is adjacent to the boundary mark 99 on the downstream side in the feed direction is detected as the end mark (the identification mark 13 in the example shown in FIG. 15) of the ID code 10. The type of the tape 230 is identified using the detected ID code 10 (namely, the arrangement pattern of the identification marks 11 to 13).

With the tape 230, presupposing that each of the adjustment holes 42 is the portion indicating both black and white, the first area 44 and the second area 45 are provided such that a color arrangement is obtained in which the non-reference portion 32 includes neither the barcode indicating the reference code 9 nor the barcode indicating the ID code 10 in the feed direction. Therefore, in a similar manner to the above-described embodiments, in the tape printer 1, even if the adjustment holes 42 are respectively detected as one of the first color (black) and the second color (white), a situation is suppressed in which a same detected pattern as the reference code 9 and the ID code 10 is mistakenly detected from the non-reference portion 32.

Figure 16:
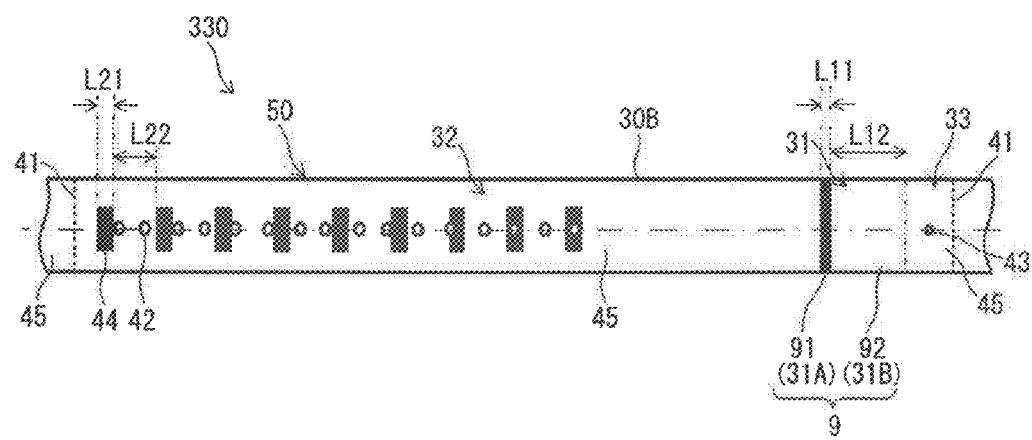
FIG. 16 is a back view of a tape according to a second modified example.

(2) The arrangement of the main mark 91 and the stability mark 92 may be changed on the tape 30. In a tape 330 shown in FIG. 16, the stability mark 92 is provided on the upstream side of the main mark 91 in the feed direction. In this case, at the above-described step S19 (refer to FIG. 7), the identification mark that is positioned on the downstream side of the stability mark 92 in the feed direction is identified as the main mark 91.

Figure 17:
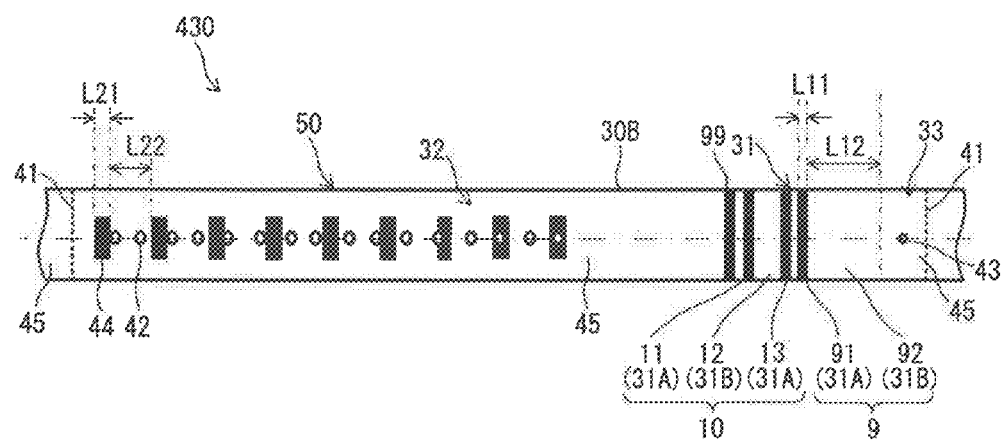
FIG. 17 is a back view of a tape according to a third modified example.

Further, an arrangement of a plurality of barcodes may be changed on the tape 30. In a tape 430 shown in FIG. 17, the ID code 10 is provided on the tape 330 shown in FIG. 16. The ID code 10 is provided on the downstream side of the reference code 9 in the feed direction. The boundary mark 99 is provided on the downstream side of the ID code 10 in the feed direction. In this case, in the tape printer 1, the black same color area that is adjacent to the boundary mark 99 on the upstream side in the feed direction is detected as the lead mark (the identification mark 11 in the example shown in FIG. 17) of the ID code 10. The black same color area that is adjacent to the main mark 91 on the downstream side in the feed direction is detected as the end mark (the identification mark 13 in the example shown in FIG. 17) of the ID code 10.

Figure 18:
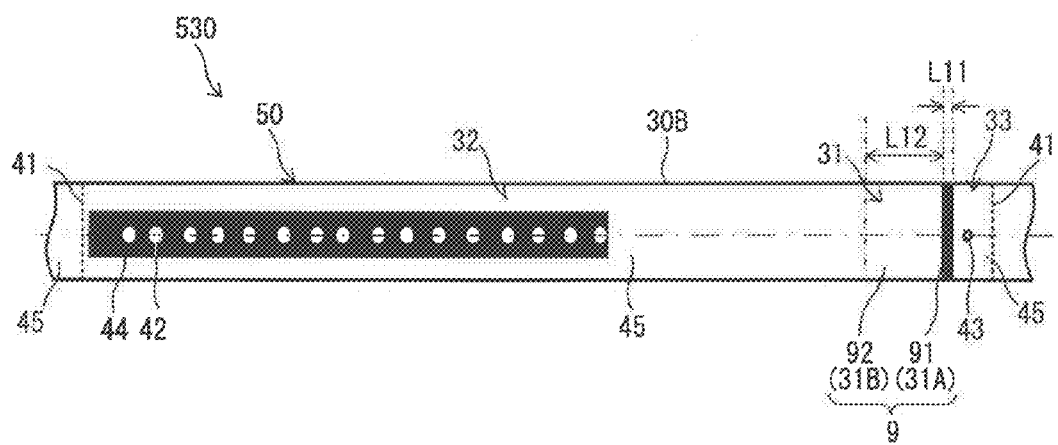
FIG. 18 is a back view of a tape according to a fourth modified example.

(3) The first area 44 may be a portion of the first color (black) that is provided across a range that includes the adjustment holes 42. In a tape 530 shown in FIG. 18, the single first area 44 is provided in the non-reference portion 32. The first area 44 is a continuous portion of the first color (black) inside which the adjustment holes 42 are formed. In this case, as the number of the first areas 44 printed in the non-reference portion 32 is small, the structure of the tape 530 is simple.

Figure 19:
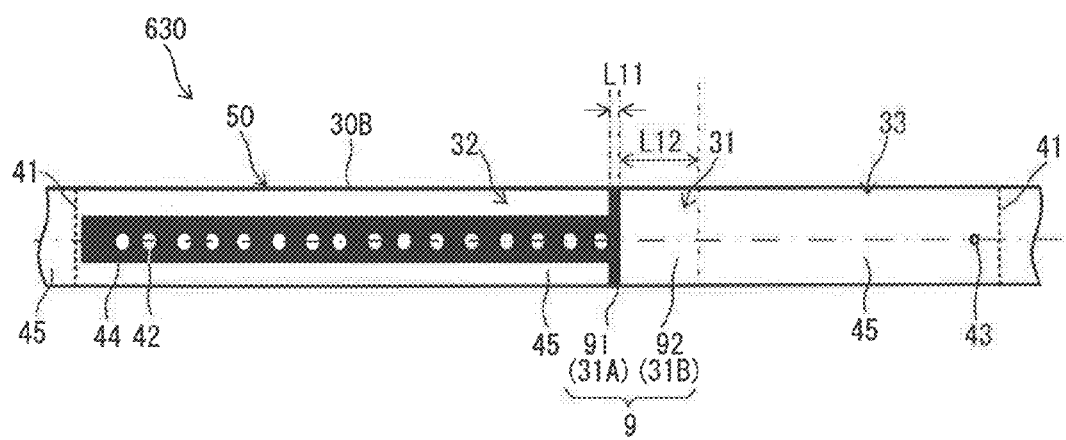
FIG. 19 is back view of a tape according to a fifth modified example.

The first area 44 may be an area that is connected to another portion of the first color (black). A tape 630 shown in FIG. 19 differs from the tape 530 shown in FIG. 18 in that the position of the reference portion 31 is different. In the tape 630, the reference portion 31 abuts with the first area 44 on the upstream side in the feed direction. The main mark 91 is positioned on the most downstream side, in the feed direction, of the reference portion 31 and is connected to the first area 44.

Figure 20:
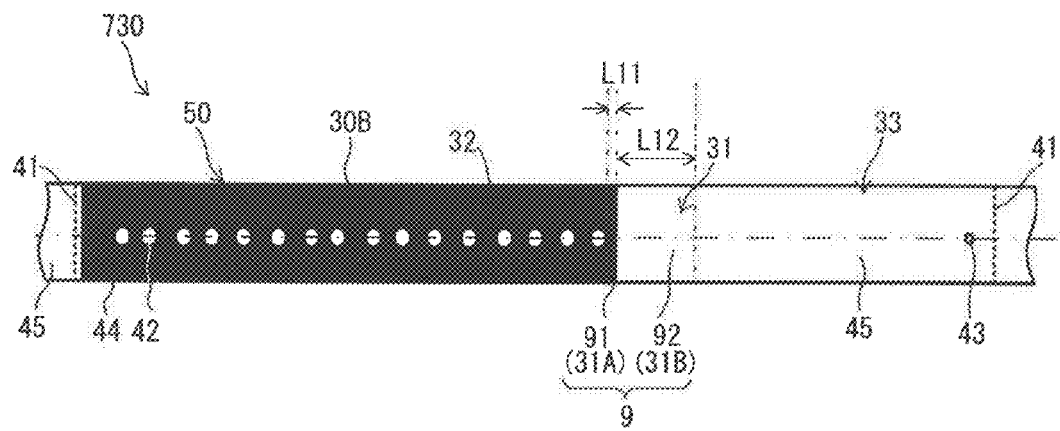
FIG. 20 is a back view of a tape according to a sixth modified example.
Figure 21:
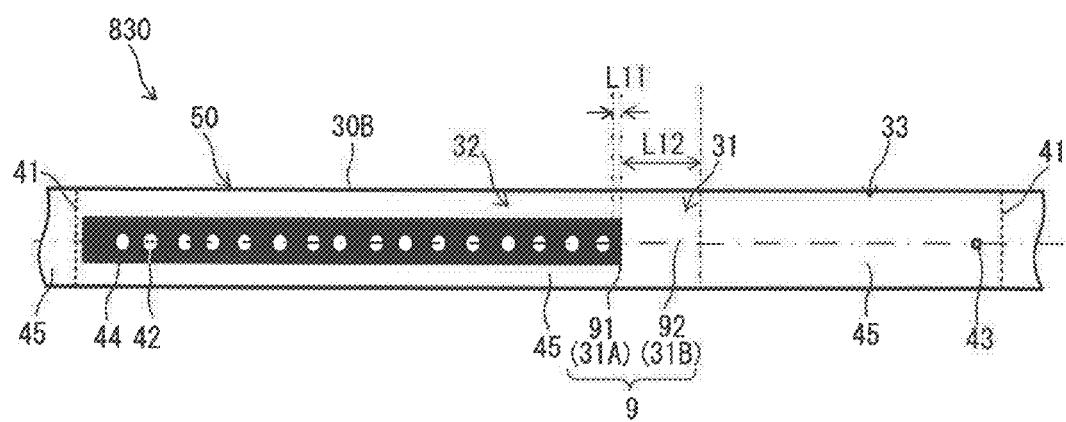
FIG. 21 is a back view of a tape according to a seventh modified example.

It is preferable that the first area 44 and the reference code 9 be provided in a range that at least includes a position in the width direction that is the same as that of the adjustment holes 42. In a tape 730 shown in FIG. 20, the length of the first area 44 in the width direction is larger than that of the tape 630 shown in FIG. 19. In the tape 730, the reference code 9 and the first area 44 both extend across an entire width of the tape 730. In a tape 830 shown in FIG. 21, the length of the reference code 9 in the width direction is smaller than that of the tape 630 shown in FIG. 19. In the tape 830, the reference code 9 and the first area 44 are positioned in a central portion, in the width direction, of the tape 830 and both the reference code 9 and the first area 44 have the same width. In both the tape 730 and the tape 830, the first area 44 and the reference code 9 include the same position in the width direction as that of the adjustment holes 42.

Figure 22:
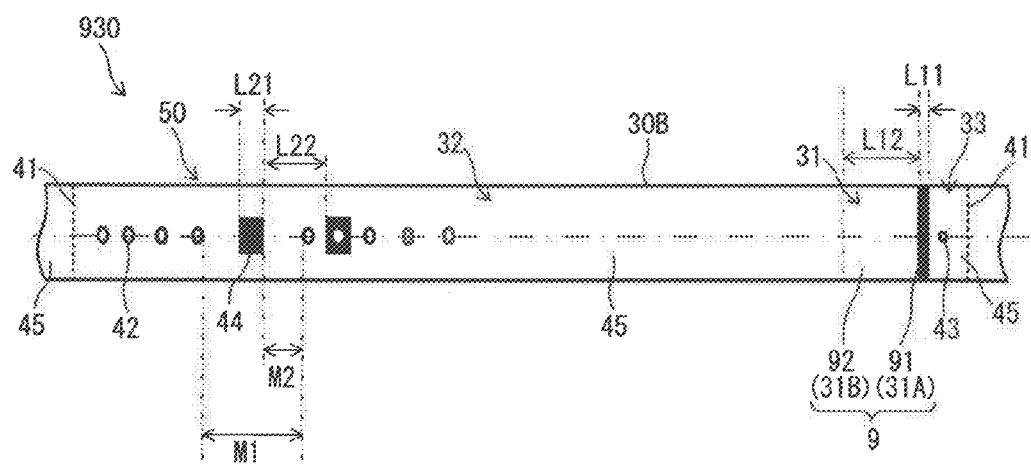
FIG. 22 is a back view of a tape according to an eighth modified example.

(4) The first area 44 may be provided between two of the adjustment holes 42 that are adjacent to each other. A distance between the two of the adjustment holes 42 in the feed direction is larger than the predetermined length (the length of the stability mark 92 in the feed direction). In a tape 930 shown in FIG. 22, the distance M1 between the two adjustment holes 42 that are adjacent in the feed direction is not uniform. At least one of the plurality of first areas 44 is provided between the two adjustment holes 42, whose distance M1 is larger than the length L12 of the stability mark 92. Therefore, it is possible to suppress the tape printer 1 from mistakenly detecting the second area 45, which is arranged between the two adjustment holes 42 that are adjacent in the feed direction, as the stability mark 92, while reducing the number of the first areas 44.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A print tape comprising:
   a print surface and a reverse surface that are both surfaces of the print tape;
   a print area that is an area provided on the print surface and in which one or more characters are printable;
   a reference portion that is an area provided on the reverse surface and that is configured to identify a position of the print area; and
   a non-reference portion that is an area provided on the reverse surface and that is provided on one of a first direction side and a second direction side of the reference portion, the first direction and the second direction being included in a lengthwise direction of the print tape and being mutually opposite directions, and the non-reference portion including a plurality of through holes that penetrate the print tape and that are aligned along the lengthwise direction with an interval therebetween, wherein the reference portion includes a barcode that is an indicator indicating the reference portion, the barcode being at least longer than each of the plurality of through holes in a width direction of the print tape, the barcode includes a first mark and a second mark that are arranged side by side, without a gap therebetween, in the lengthwise direction in a predetermined order, the first mark being a portion of a first color that is one of black and white, and the second mark being a portion of a second color that is one of black and white and is different than the first color, the non-reference portion comprises at least one first area that is an area of the first color provided on at least one of the first direction side and the second direction side with respect to each of at least one of the plurality of through holes, and a second area that is an area of the second color provided on a portion that is different than the at least one first area of the non-reference portion, the at least one first area and the second area are provided to obtain a color arrangement in which the non-reference portion does not include the barcode in the lengthwise direction, and all of the plurality of through holes overlap with the barcode, the at least one first area, and the second area when viewed in the lengthwise direction.

2. The print tape according to claim 1, wherein the barcode includes a main mark that is the first mark having a prescribed length in the lengthwise direction, and a length in the lengthwise direction of each of the at least one first area is larger than the length in the lengthwise direction of the main mark.

3. The print tape according to claim 2, wherein the barcode includes a stability mark provided on one of the first direction side and the second direction side with respect to the main mark, the stability mark being the second mark having a length in the lengthwise direction that is larger than the length in the lengthwise direction of the main mark.

4. The print tape according to claim 3, wherein the length in the lengthwise direction of the stability mark is larger than a distance between two through holes that are adjacent to each other in the lengthwise direction, among the plurality of through holes.

5. The print tape according to claim 3, wherein the length in the lengthwise direction of the stability mark is larger than a distance between one of the through holes and a target area, the target area being one of the at least one first area, that is adjacent to the one of the through holes in the lengthwise direction.

6. The print tape according to claim 3, wherein the at least one first area includes a plurality of first areas provided in the lengthwise direction with an interval therebetween, and a distance between two of the first areas that are adjacent to each other in the lengthwise direction, among the plurality of first areas, is different than the length in the lengthwise direction of the stability mark.

7. The print tape according to claim 6, wherein at least one of the plurality of first areas is provided between two of the through holes that are adjacent to each other in the lengthwise direction, a distance between the two of the through holes being larger in the lengthwise direction than a predetermined length, and the predetermined length is the length in the lengthwise direction of the stability mark.

8. The print tape according to claim 1, wherein the at least one first area is a portion of the first color that is provided across a range including the plurality of through holes.

9. The print tape according to claim 1, wherein each of the at least one first area is longer in the width direction than a target hole, the target hole being, of the plurality of through holes, a through hole that is adjacent to each of the at least one first area in the lengthwise direction, and the barcode is longer in the width direction than each of the at least one first area.

10. The print tape according to claim 9, wherein the barcode extends across an entire width of the print tape.

11. A print tape that is configured to be used by a tape printer, the print tape comprising:

a print surface and a reverse surface that are both surfaces of the print tape;

a print area that is an area provided on the print surface and in which one or more characters are printable;

a reference portion that is an area provided on the reverse surface and that is configured to identify a position of the print area, the tape printer being configured to irradiate detection light onto the print tape that is being fed in a lengthwise direction of the print tape and to detect the reference portion based on an amount of reflected light; and a non-reference portion that is an area provided on the reverse surface and that is provided on one of a first direction side and a second direction side of the reference portion, the first direction and the second direction being included in the lengthwise direction of the print tape and being mutually opposite directions, and the non-reference portion including a plurality of unstable portions that are aligned along the lengthwise direction with an interval therebetween, wherein the reference portion includes a barcode that is an indicator indicating the reference portion, the barcode being at least longer than each of the plurality of unstable portions in a width direction of the print tape, the barcode includes a first mark and a second mark that are arranged side by side, without a gap therebetween, in the lengthwise direction in a predetermined order, the first mark being a portion of a first color that is configured to make the amount of reflected light less than a predetermined threshold value, and the second mark being a portion of a second color that is configured to make the amount of reflected light equal to or more than the threshold value, the plurality of unstable portions are portions for which the amount of reflected light is less than the threshold value or is equal to or more than the threshold value, depending on a magnitude of the threshold value, the non-reference portion comprises at least one first area that is an area of the first color provided on at least one of the first direction side and the second direction side with respect to each of at least one of the plurality of unstable portions, and a second area that is an area of the second color provided on a portion that is different than the at least one first area of the non-reference portion, the at least one first area and the second area are provided to obtain a color arrangement in which the non-reference portion does not include the barcode in the lengthwise direction, and all of the plurality of unstable portions overlap with the barcode, the at least one first area, and the second area when viewed in the lengthwise direction.

12. The print tape according to claim 11, wherein
the barcode includes a main mark that is the first mark having a prescribed length in the lengthwise direction, and
a length in the lengthwise direction of each of the at least one first area is larger than the length in the lengthwise direction of the main mark.

13. The print tape according to claim 12, wherein the barcode includes a stability mark provided on one of the first direction side and the second direction side with respect to the main mark, the stability mark being the second mark having a length in the lengthwise direction that is larger than the length in the lengthwise direction of the main mark.

14. The print tape according to claim 11, wherein
each of the at least one first area is longer in the width direction than a target portion, the target portion being, of the plurality of unstable portions, an unstable portion that is adjacent to each of the at least one first area in the lengthwise direction, and
the barcode is longer in the width direction than each of the at least one first area.

15. The print tape according to claim 14, wherein the barcode extends across an entire width of the print tape.

16. The print tape according to claim 11, wherein each of the plurality of unstable portions is one of a through hole that penetrates through the print tape and an image that is printed in an intermediate color between the first color and the second color.

17. A tape printer comprising:
a feeding portion configured to feed a print tape in a lengthwise direction, the print tape including a print surface and a reverse surface that are both surfaces of the print tape, the print surface including a print area in which one or more characters are printable, the reverse surface including a reference portion and a non-reference portion, the reference portion being an area that is configured to identify a position of the print area, the non-reference portion being an area that is provided on one of a first direction side and a second direction side of the reference portion, the first direction and the second direction being included in the lengthwise direction of the print tape and being mutually opposite directions, the non-reference portion including a plurality of unstable portions that are aligned along the lengthwise direction with an interval therebetween, the reference portion including a barcode that is an indicator indicating the reference portion, and the barcode being at least longer than each of the plurality of unstable portions in a width direction of the print tape;
a print head configured to print one or more characters onto the print tape that is fed by the feeding portion;
a reflective sensor configured to irradiate a detection light onto at least a position in the width direction at which the reference portion is provided, on the print tape fed by the feeding portion, and configured to measure an amount of reflected light, the barcode including a first mark and a second mark that are arranged side by side, without a gap therebetween, in the lengthwise direction in a predetermined order, the first mark being a portion of a first color that is configured to make the amount of reflected light less than a predetermined threshold value, the second mark being a portion of a second color that is configured to make the amount of reflected light equal to or more than the threshold value, the plurality of unstable portions being portions for which the amount of reflected light is less than the threshold value or is equal to or more than the threshold value, depending on a magnitude of the threshold value, the non-reference portion including at least one first area and a second area, the at least one first area being an area of the first color provided on at least one of the first direction side and the second direction side with respect to each of at least one of the plurality of unstable portions, the second area being an area of the second color provided on a portion that is different than the at least one first area of the non-reference portion, the at least one first area and the second area being provided to obtain a color arrangement in which the non-reference portion does not include the barcode in the lengthwise direction, wherein all of the plurality of unstable portions overlap with the barcode, the at least one first area, and the second area when viewed in the lengthwise direction;
a processor; and
a memory storing computer-readable instructions, the computer-readable instructions, when executed by the processor, causing the tape printer to perform operations comprising:
detecting, based on the amount of reflected light measured by the reflective sensor, a first continuous portion over which the second color continues for at least a predetermined length,
detecting, based on the amount of reflected light measured by the reflective sensor, a second continuous portion over which the first color continues within a predetermined range, and which is adjacent to the first continuous portion in a feed direction of the print tape, and
causing the print head to print one or more characters on the print area of the print tape that is fed by the feeding portion, based on the reference portion that includes the detected first continuous portion and the detected second continuous portion.

18. The tape printer according to claim 17, wherein the reflective sensor is a movable body configured to move within a range in the width direction in which at least the reference portion is provided.

19. The tape printer according to claim 17, further comprising the print tape, wherein each of the plurality of unstable portions is one of a plurality of through holes that penetrates through the print tape and an image that is printed in an intermediate color between the first color and the second color.

* * * * *